(12) United States Patent
Sasanka

(10) Patent No.: US 9,558,006 B2
(45) Date of Patent: Jan. 31, 2017

(54) CONTINUOUS AUTOMATIC TUNING OF CODE REGIONS

(71) Applicant: Intel Corporation, Santa Clara, CA (US)

(72) Inventor: Ruchira Sasanka, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 13/722,243

(22) Filed: Dec. 20, 2012

(65) Prior Publication Data

US 2014/0181487 A1 Jun. 26, 2014

(51) Int. Cl.
*G06F 9/44* (2006.01)
*G06F 11/34* (2006.01)
*G06F 1/32* (2006.01)

(52) U.S. Cl.
CPC ............ *G06F 9/4401* (2013.01); *G06F 1/324* (2013.01); *G06F 1/3287* (2013.01); *G06F 1/3296* (2013.01); *G06F 9/4411* (2013.01); *G06F 11/3409* (2013.01); *G06F 11/3442* (2013.01); *G06F 11/3466* (2013.01); *G06F 2201/865* (2013.01); *G06F 2201/88* (2013.01); *G06F 2201/885* (2013.01); *Y02B 60/1217* (2013.01); *Y02B 60/1282* (2013.01); *Y02B 60/1285* (2013.01)

(58) Field of Classification Search
CPC ...... G06F 1/3287; G06F 1/324; G06F 1/3296; G06F 11/3466; G06F 11/3409; G06F 2201/885; G06F 2201/865; G06F 2201/88

USPC .......................................................... 703/21
See application file for complete search history.

(56) References Cited

U.S. PATENT DOCUMENTS

| | | | |
|---|---|---|---|
| 5,845,310 A | 12/1998 | Brooks | |
| 6,643,609 B2* | 11/2003 | Phan | G06F 11/3409 |
| | | | 702/178 |
| 8,276,015 B2* | 9/2012 | Floyd | G06F 1/3203 |
| | | | 713/322 |
| 8,484,643 B2* | 7/2013 | Takatsu | G06F 11/3423 |
| | | | 718/101 |
| 8,819,653 B2* | 8/2014 | Turner | G06F 8/443 |
| | | | 717/140 |
| 2006/0020838 A1 | 1/2006 | Tschanz et al. | |
| 2007/0050661 A1 | 3/2007 | Ferren et al. | |
| 2012/0137120 A1 | 5/2012 | Fischer et al. | |

OTHER PUBLICATIONS

Christopher J. Hughes, "Controlling Adaptation for Multimedia Applications", Dec. 12, 2002, Ph.D. Thesis Proposal, University of Illinois at Urbana-Champaign, pp. 1-31.*

(Continued)

*Primary Examiner* — Kamini S Shah
*Assistant Examiner* — Juan Ochoa
(74) *Attorney, Agent, or Firm* — Lowenstein Sandler LLP

(57) ABSTRACT

Described herein are mechanisms for continuous automatic tuning of code regions for optimal hardware configurations for the code regions. One mechanism automatically tunes the tunable parameters for a demarcated code region by calculating metrics while executing the code region with different sets of tunable parameters and selecting one of the different sets based on the calculated metrics.

22 Claims, 25 Drawing Sheets

(56) References Cited

OTHER PUBLICATIONS

Steve Dropsho et al., Integrating Adaptive On-Chip Storage Structures for Reduced Dynamic Power, 2002, Proc. of the Intl. Conf. on Parallel Architectures and Compilation Techniques, pp. 1-12.*

Huang et al., A Framework for Dynamic Energy Efficiency and Temperature Management, 2000, Proc. of the 33rd Annual International Symposium on Microarchitecture, pp. 1-11.*

International Search Report and Written Opinion received for Patent Application No. PCT/US2013/046494, mailed on Oct. 31, 2013, 10 pages.

* cited by examiner

| 127 | 120 119 | 112 111 | 104 103 | | | | 24 23 | 16 15 | 8 7 | 0 |
|---|---|---|---|---|---|---|---|---|---|---|
| bbbb bbbb | bbbb bbbb | bbbb bbbb | • | • | • | | bbbb bbbb | bbbb bbbb | bbbb bbbb | |

UNSIGNED PACKED BYTE REPRESENTATION 344

| 127 | 120 119 | 112 111 | 104 103 | | | | 24 23 | 16 15 | 8 7 | 0 |
|---|---|---|---|---|---|---|---|---|---|---|
| sbbb bbbb | sbbb bbbb | sbbb bbbb | • | • | • | | sbbb bbbb | sbbb bbbb | sbbb bbbb | |

SIGNED PACKED BYTE REPRESENTATION 345

| 127 | 112 111 | | | | 16 15 | 0 |
|---|---|---|---|---|---|---|
| wwww wwww wwww wwww | • | • | • | wwww wwww wwww wwww | | |

UNSIGNED PACKED WORD REPRESENTATION 346

| 127 | 112 111 | | | | 16 15 | 0 |
|---|---|---|---|---|---|---|
| swww wwww wwww wwww | • | • | • | swww wwww wwww wwww | | |

SIGNED PACKED WORD REPRESENTATION 347

| 127 | 92 91 | 32 31 | 0 |
|---|---|---|---|
| dddd dddd dddd dddd dddd dddd dddd dddd | • • • | dddd dddd dddd dddd dddd dddd dddd dddd | |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | • • • | sddd dddd dddd dddd dddd dddd dddd dddd | |

SIGNED PACKED DOUBLEWORD REPRESENTATION 349

FIG. 3C

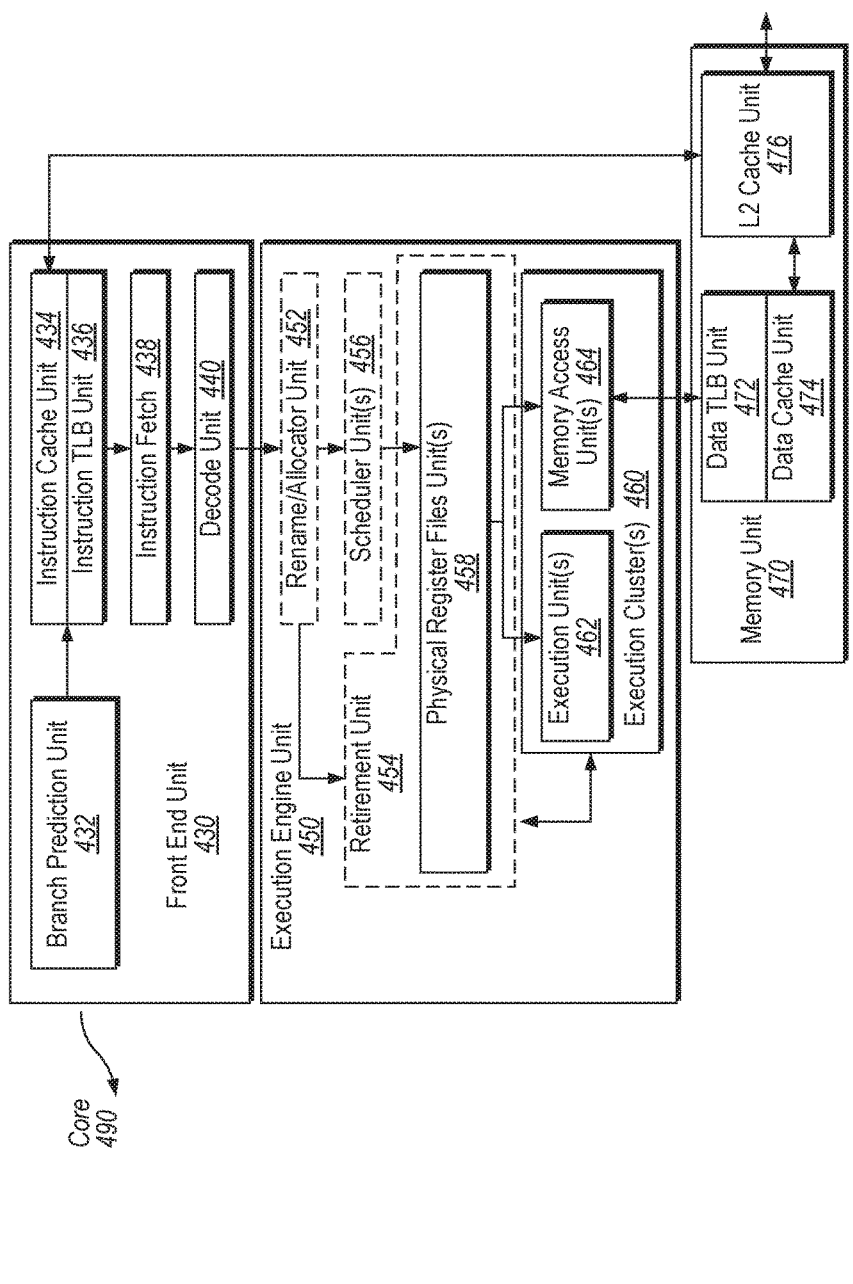
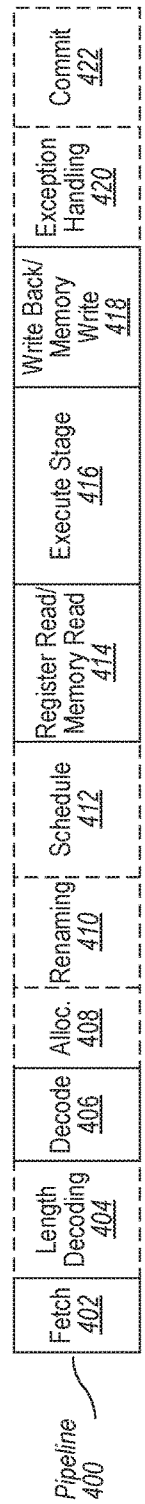
FIG. 4B
FIG. 4A

CONTINUOUS AUTOMATIC TUNING OF CODE REGIONS

FIELD

The present disclosure pertains to the field of processing logic, microprocessors, and associated instruction set architecture that, when executed by the processor or other processing logic, perform logical, mathematical, or other functional operations.

BACKGROUND

Processors have many tunable parameters that can be set either at manufacturing, at system boot time, such as by the Basic Input-Output System (BIOS), or at runtime such as by the operating system (OS). Some of these tunable parameters include: (1) Hardware (HW) prefetcher settings, including turning on or off some HW prefetchers; (2) Software (SW) prefetch instruction settings, including ignoring or honoring SW prefetch instructions; (3) Cache evict/replacement hints, including ignoring or honoring cache evict/replacement hints; (4) Cache sizes, including dynamically configuring the cache sizes; (5) Dynamic Random-Access Memory (DRAM) channels, including configuring DRAM page opening policies and buffer sizes; and (6) HW buffer size, including configuring various HW buffer sizes or HW structure sizes.

Such parameters are generally set permanently (e.g., in BIOS) to be compatible with a wide variety of applications. As such, these settings may not be optimal for a given application. For instance, a given prefetcher setting may be beneficial to application A, whereas the same setting may reduce the performance of application B. In addition, because the prefetcher setting is fixed for a wide variety of applications, this setting is not tuned for optimizing the execution of application B.

Tunable parameters can be even coarser grain—for instance, in a heterogeneous-core processor, cores with different capabilities are present (e.g., Atom and Xeon cores). Here, instead of picking a prefetcher setting, an entire core is picked to run a piece of code. An Atom core could be adequate for running one piece of code, whereas another piece of code can truly benefit from a Xeon core.

BRIEF DESCRIPTION OF THE DRAWINGS

FIG. 3C illustrates packed data types according to one embodiment.

FIG. 4A illustrates elements of a processor micro-architecture according to one embodiment.

FIG. 4B illustrates elements of a processor micro-architecture according to one embodiment.

DETAILED DESCRIPTION

Figure 1A:
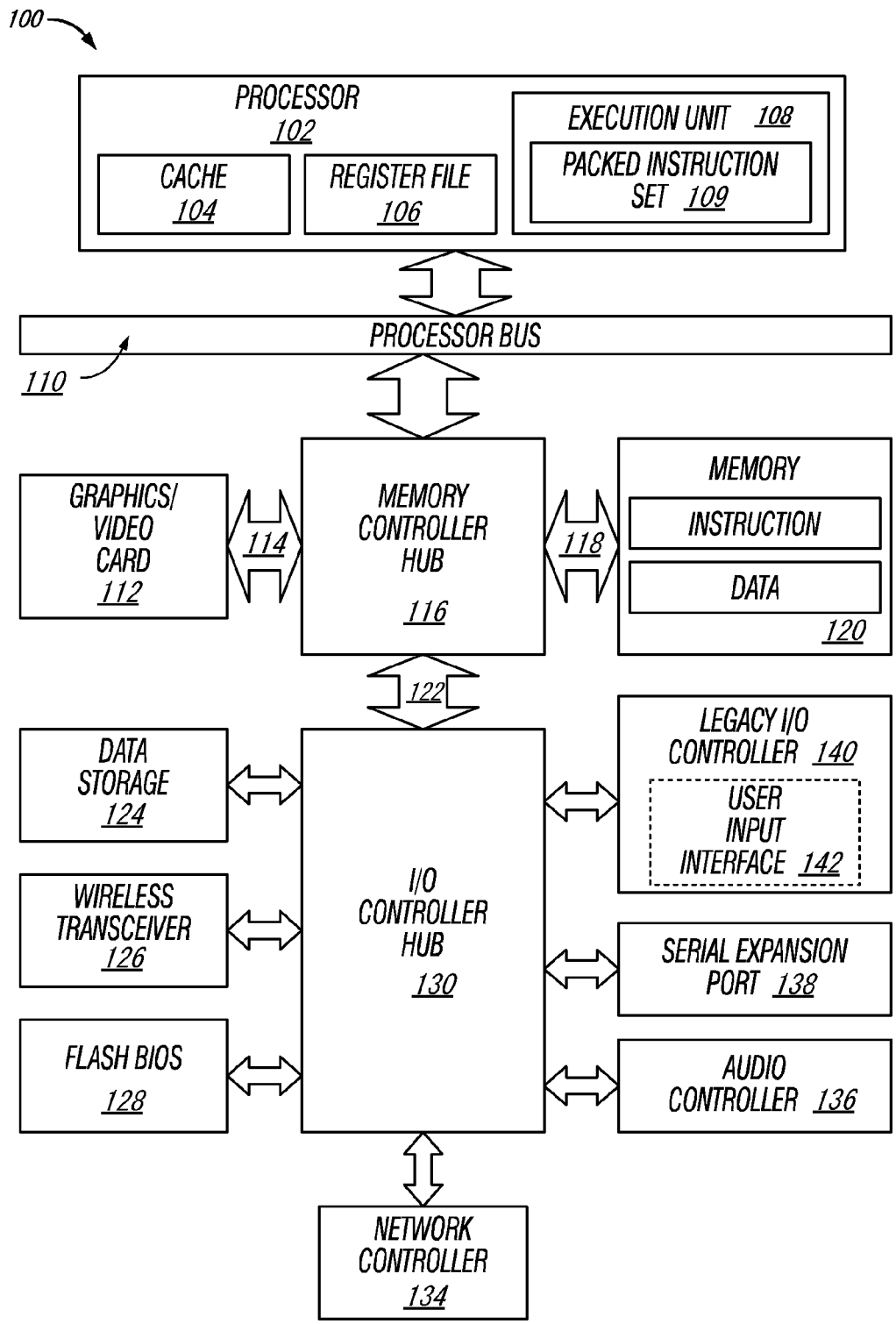
FIG. 1a is a block diagram of a system according to one embodiment.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or portable computers, such as the Intel® Ultrabooks™ computers. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, the Intel) Pentium 4 processors, the Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may be a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, the MMX™ instruction set, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

Turning to FIG. 1A, a block diagram of an exemplary computer system formed with a processor that includes execution units to execute an instruction, where one or more of the interconnects implement one or more features in accordance with one embodiment of the present invention is illustrated. System 100 includes a component, such as a processor 102 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 102 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that transmits data signals between the processor 102 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 102 includes a Level 1 (L1) internal cache memory 104. Depending on the architecture, the processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 102. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
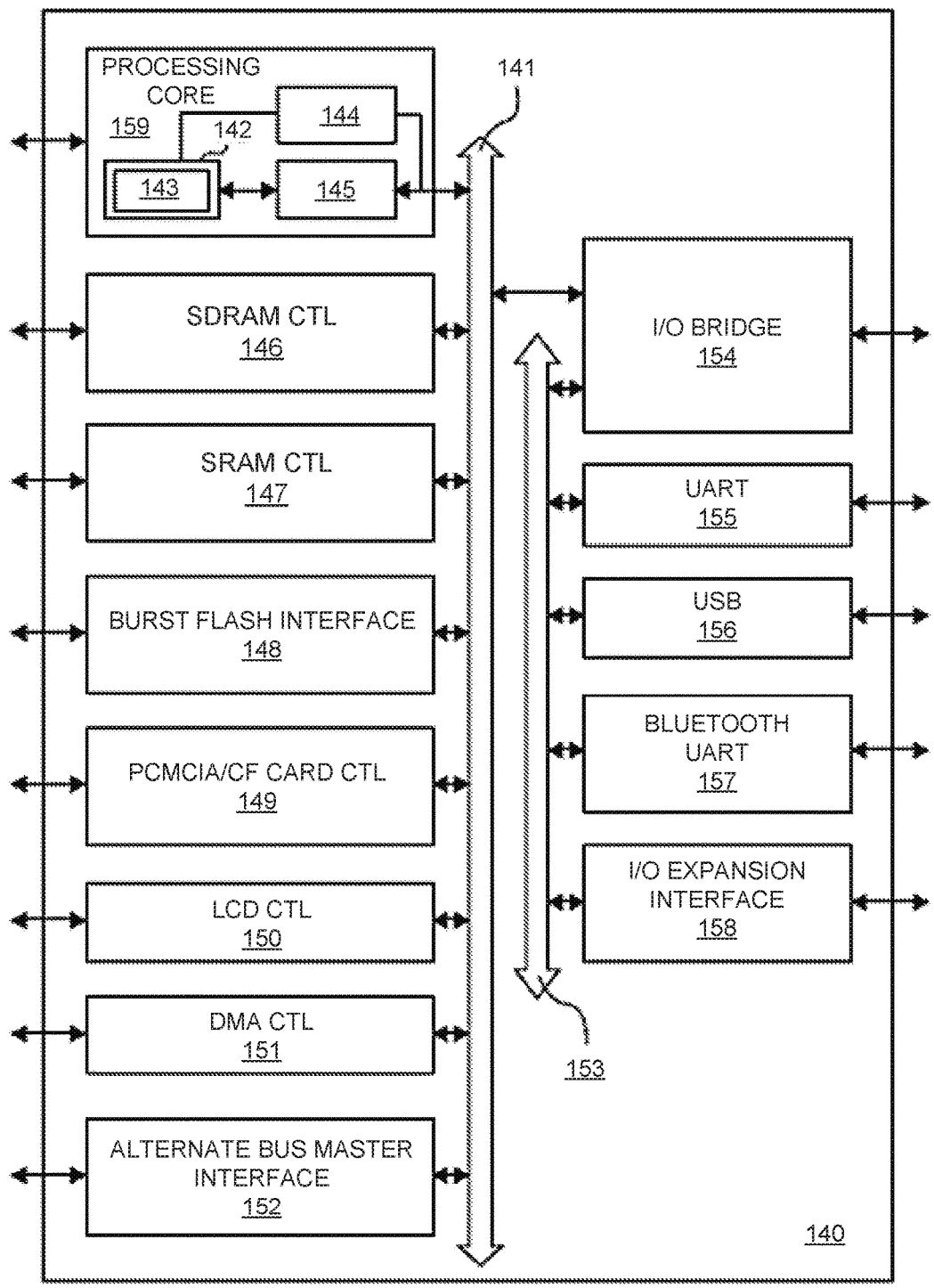
FIG. 1b is a block diagram of a system according to one embodiment.

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
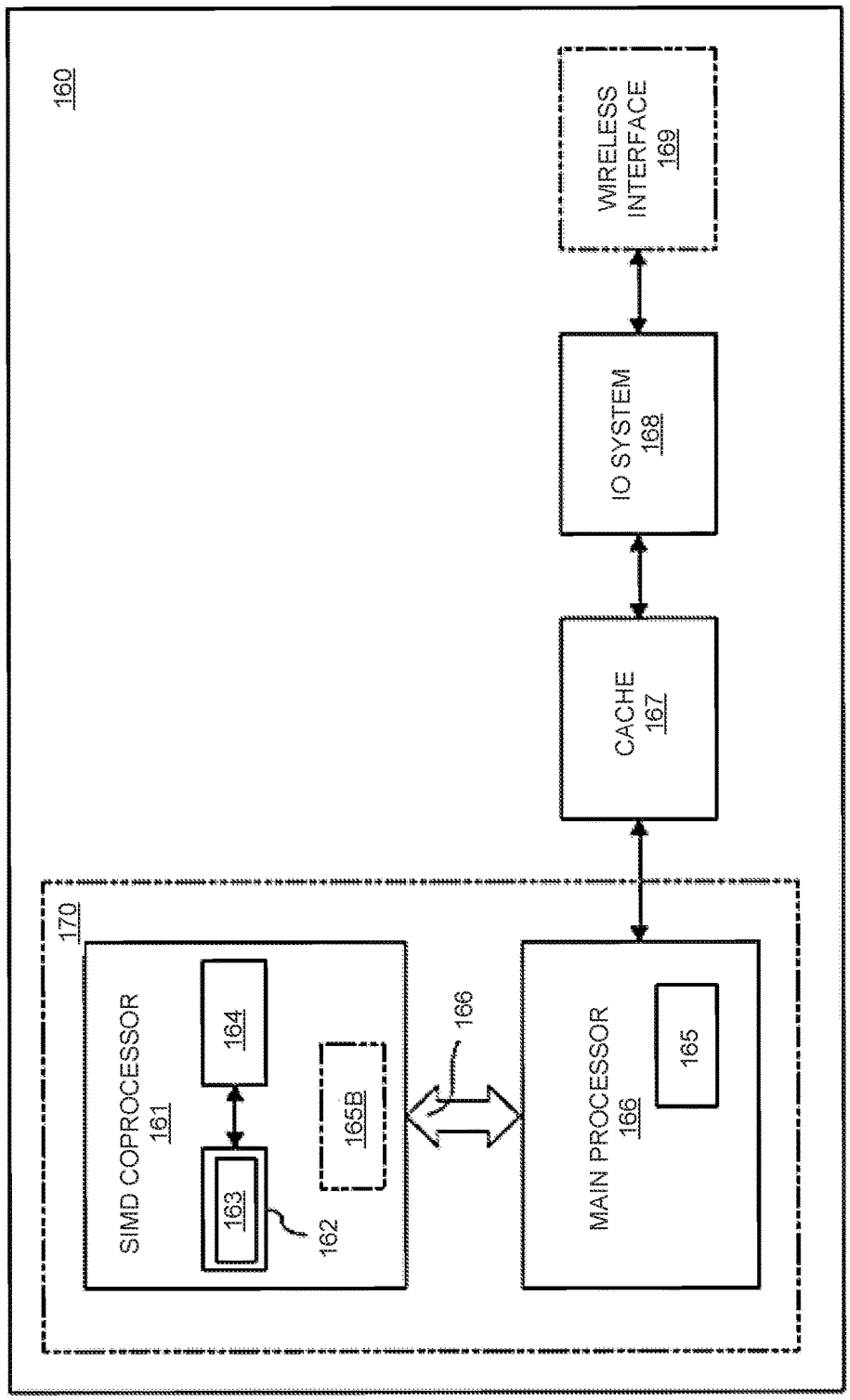
FIG. 1c is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
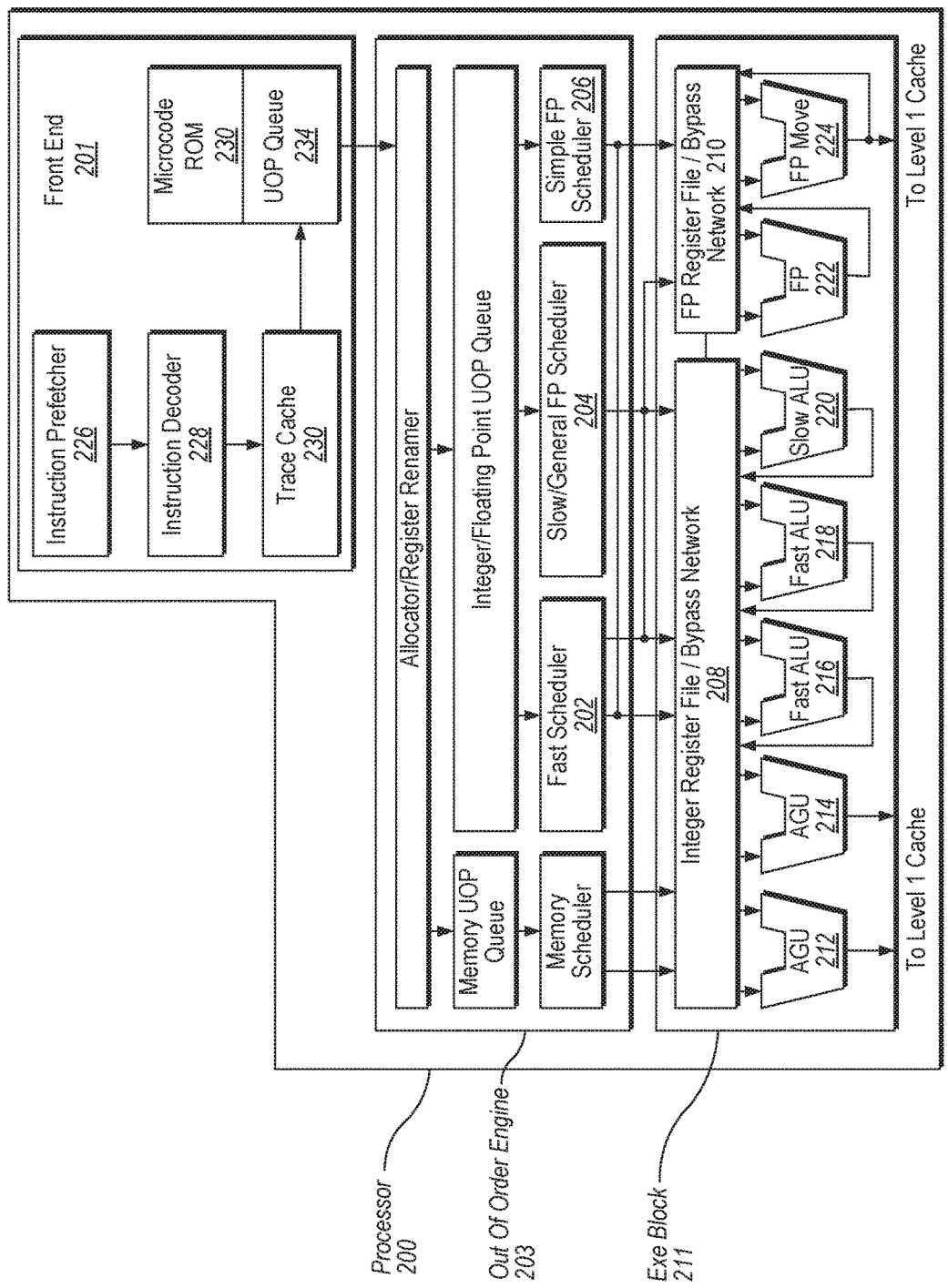
FIG. 2 is a block diagram of a processor according to one embodiment.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
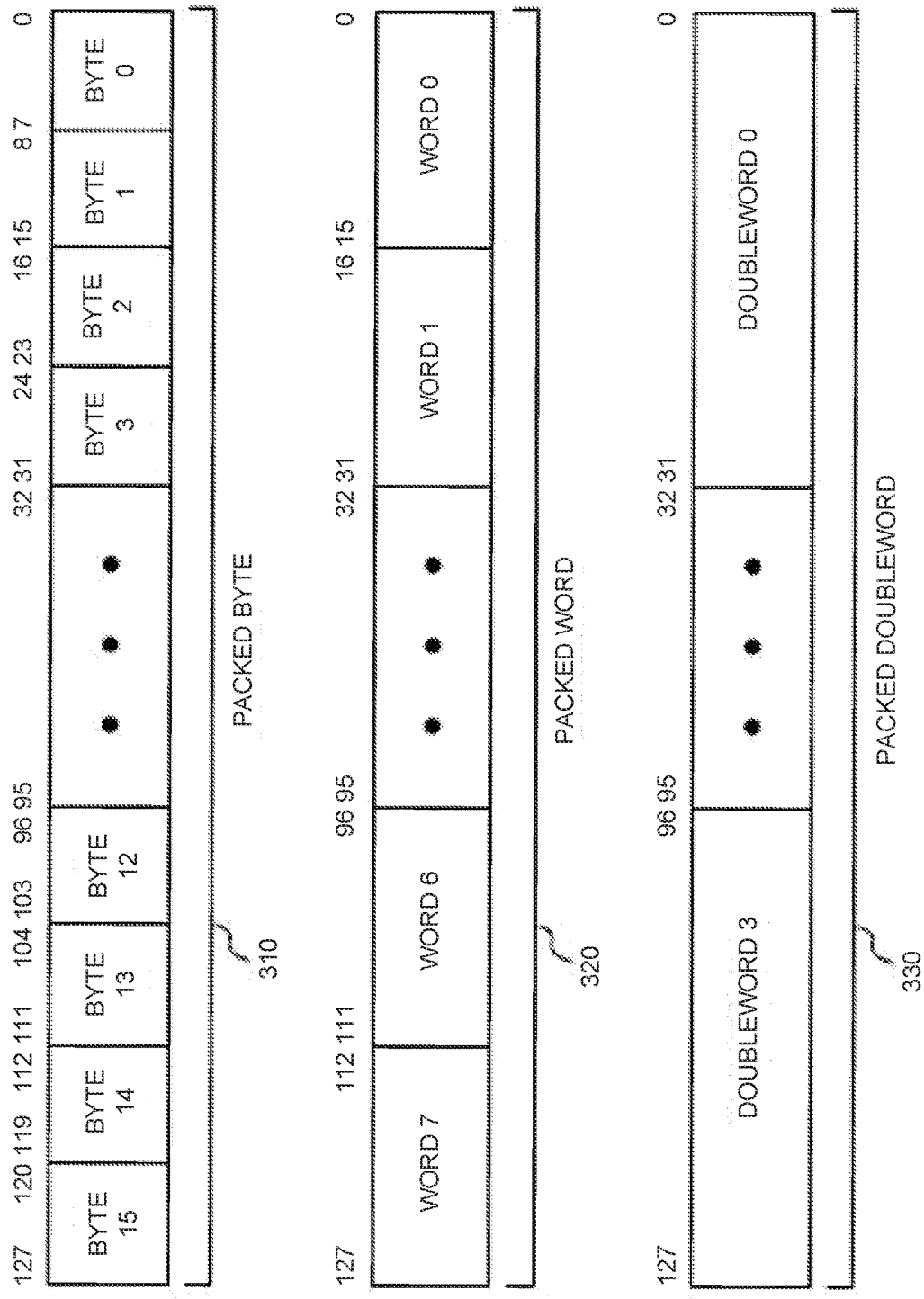
FIG. 3A illustrates packed data types according to one embodiment.

In the examples of the following figures, a number of data operands are described. FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
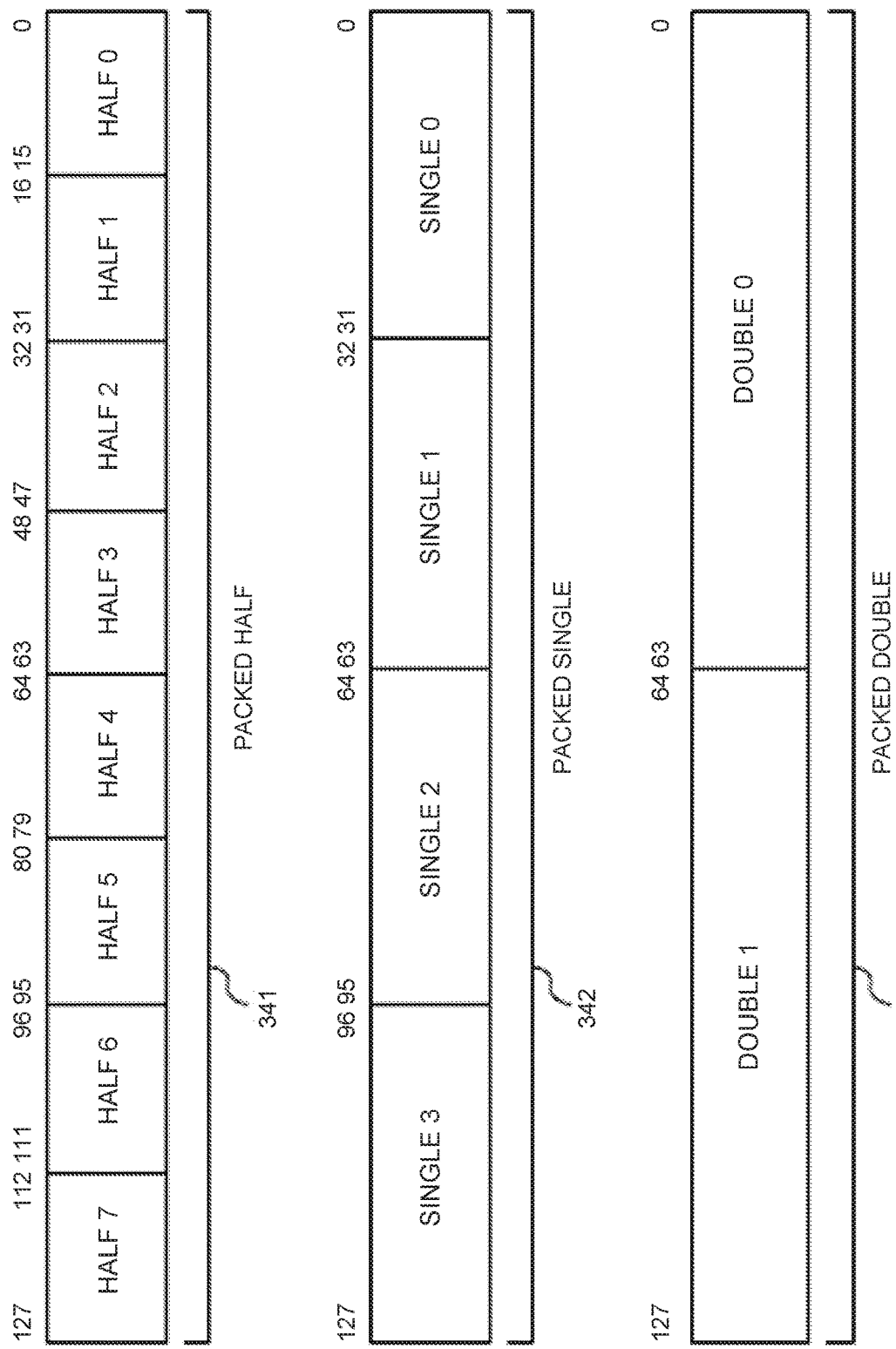
FIG. 3B illustrates packed data types according to one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers according to one embodiment of the present invention. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
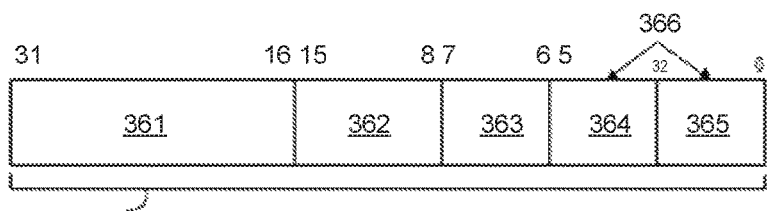
FIG. 3D illustrates an instruction encoding according to one embodiment.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
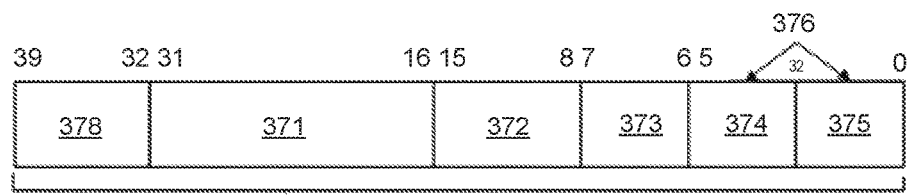
FIG. 3E illustrates an instruction encoding according to one embodiment.

FIG. 3E is a depiction of another alternative operation encoding (opcode) format 370, having forty or more bits. Opcode format 370 corresponds with opcode format 360 and comprises a prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by scale-index-base and displacement bytes.

Figure 3F:
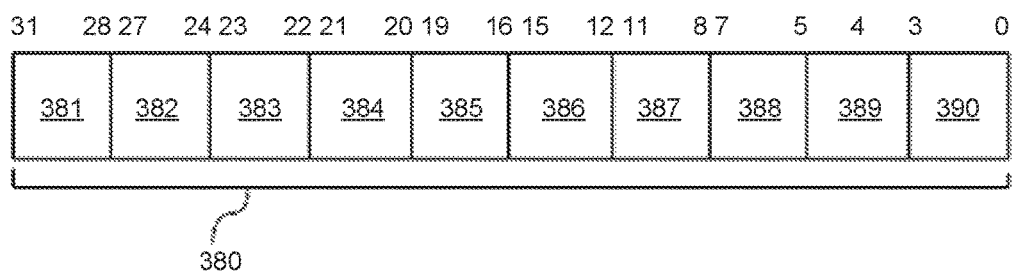
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g. the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
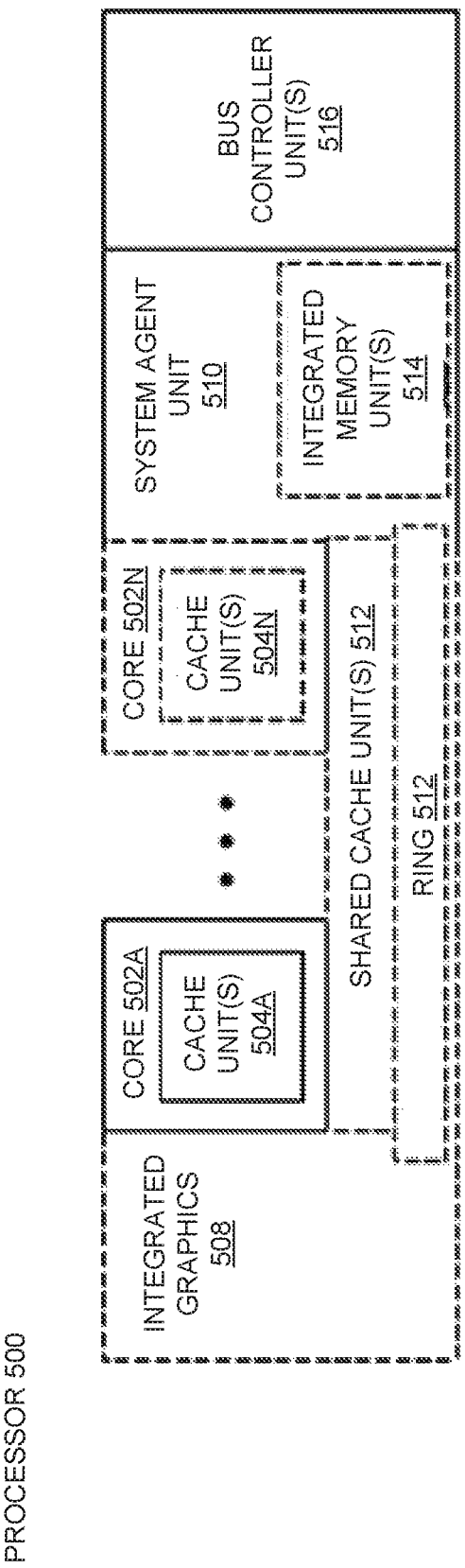
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the addition of the dashed lined boxes illustrates an alternative processor 500 with multiple cores 502A-N, a set of one or more integrated memory controller unit(s) 514 in the system agent unit 510, and an integrated graphics logic 508.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading.

The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
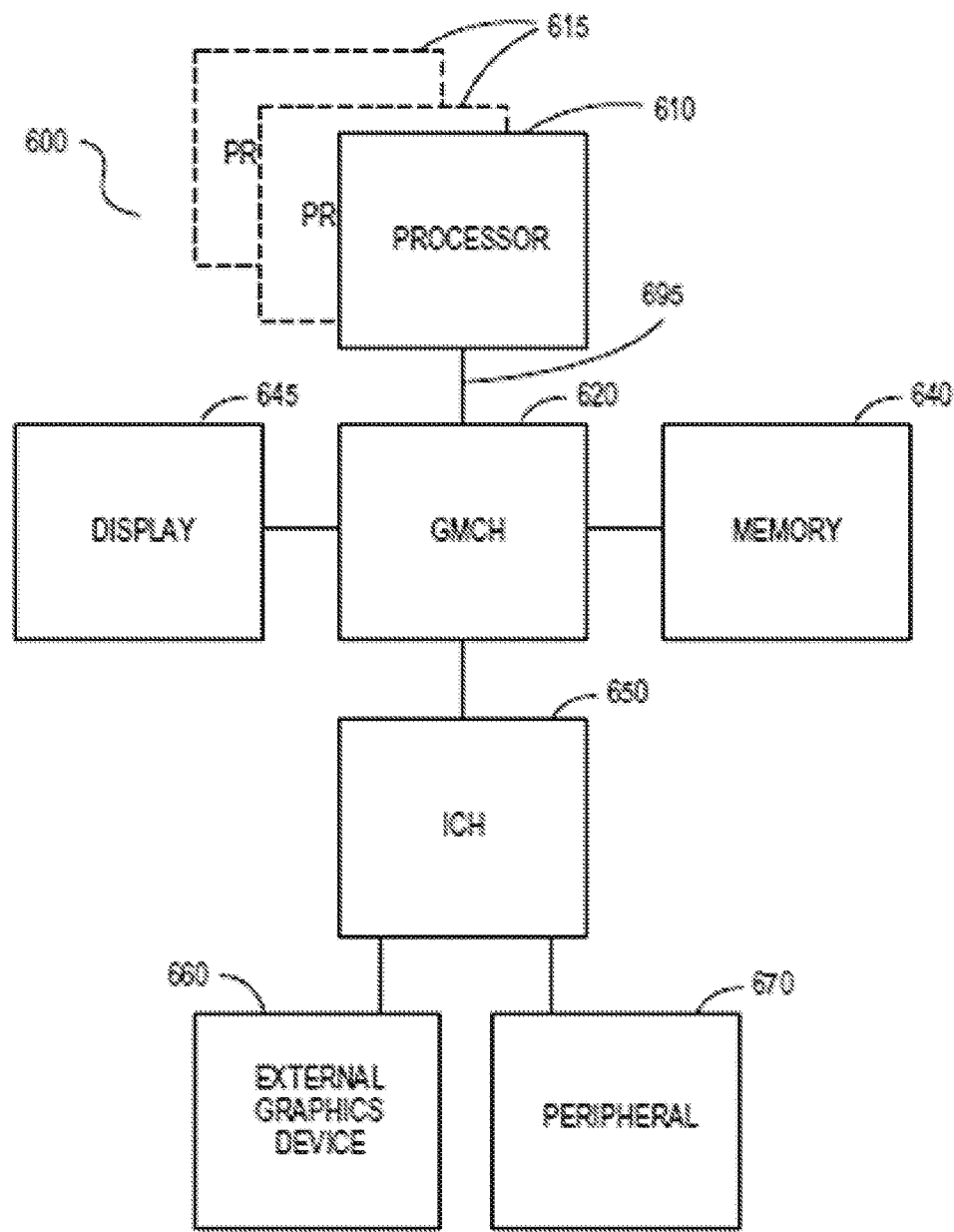
FIG. 6 is a block diagram of a computer system according to one embodiment.
Figure 7:
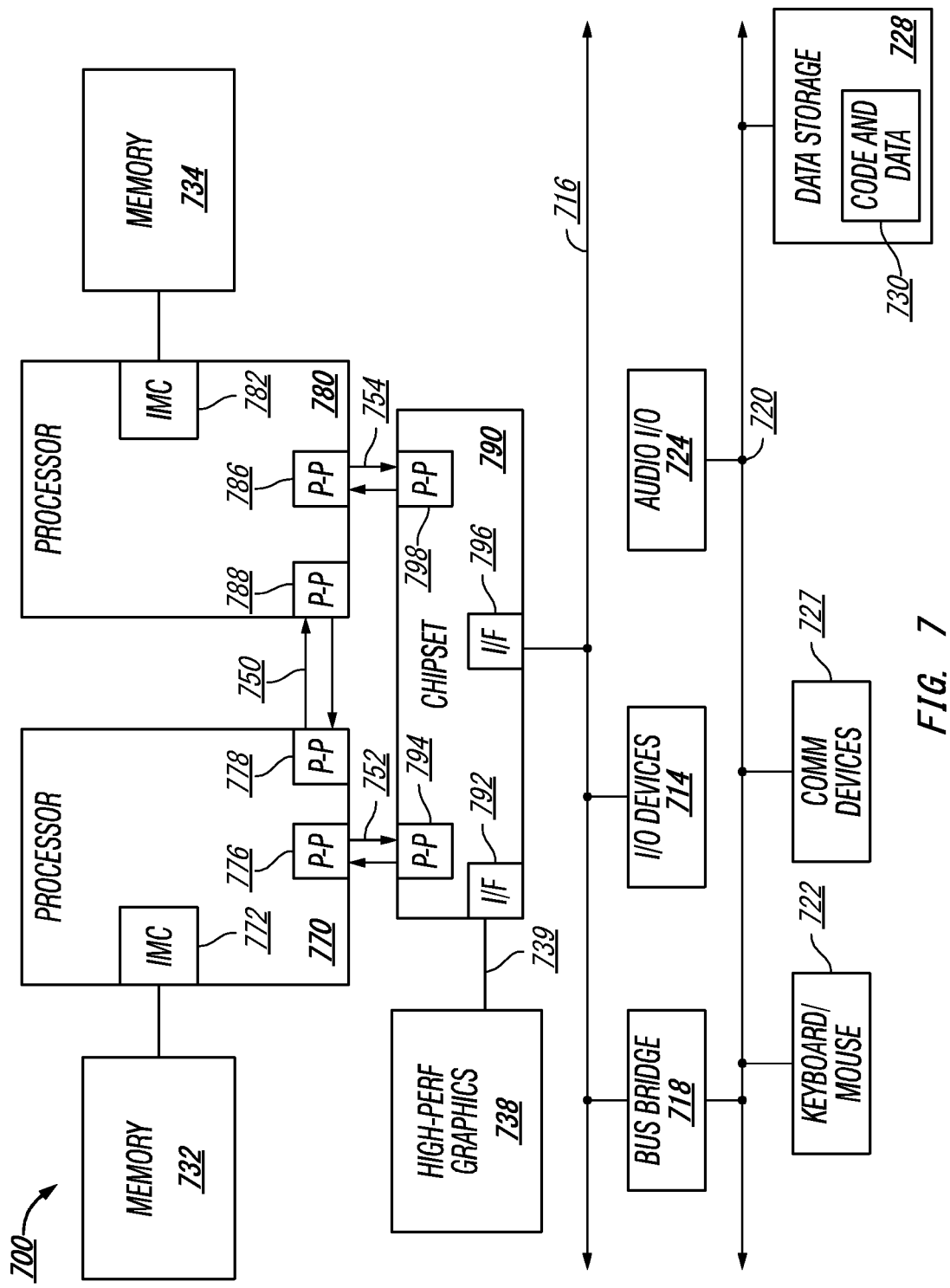
FIG. 7 is a block diagram of a computer system according to one embodiment.
Figure 8:
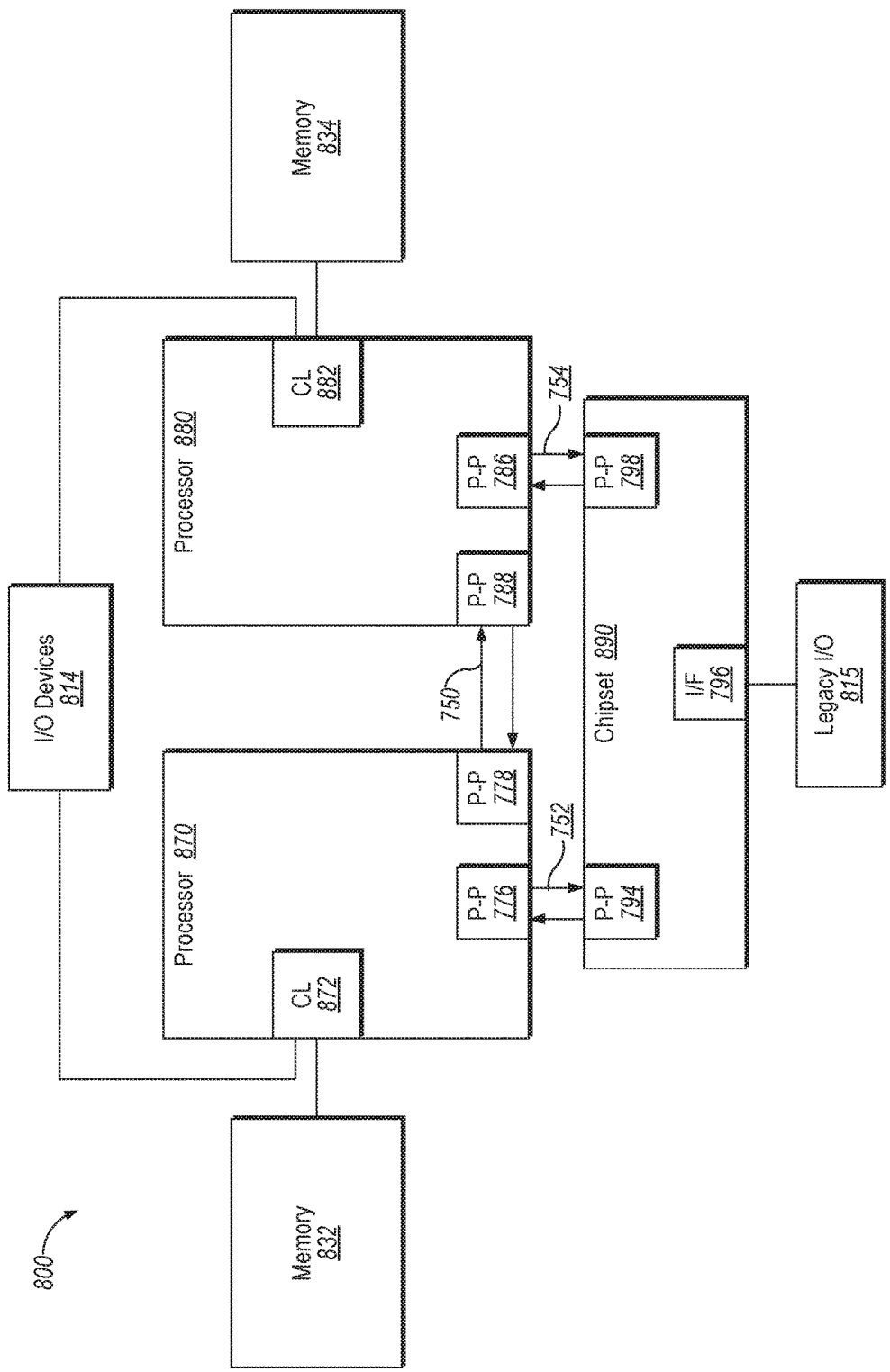
FIG. 8 is a block diagram of a computer system according to one embodiment.
Figure 9:
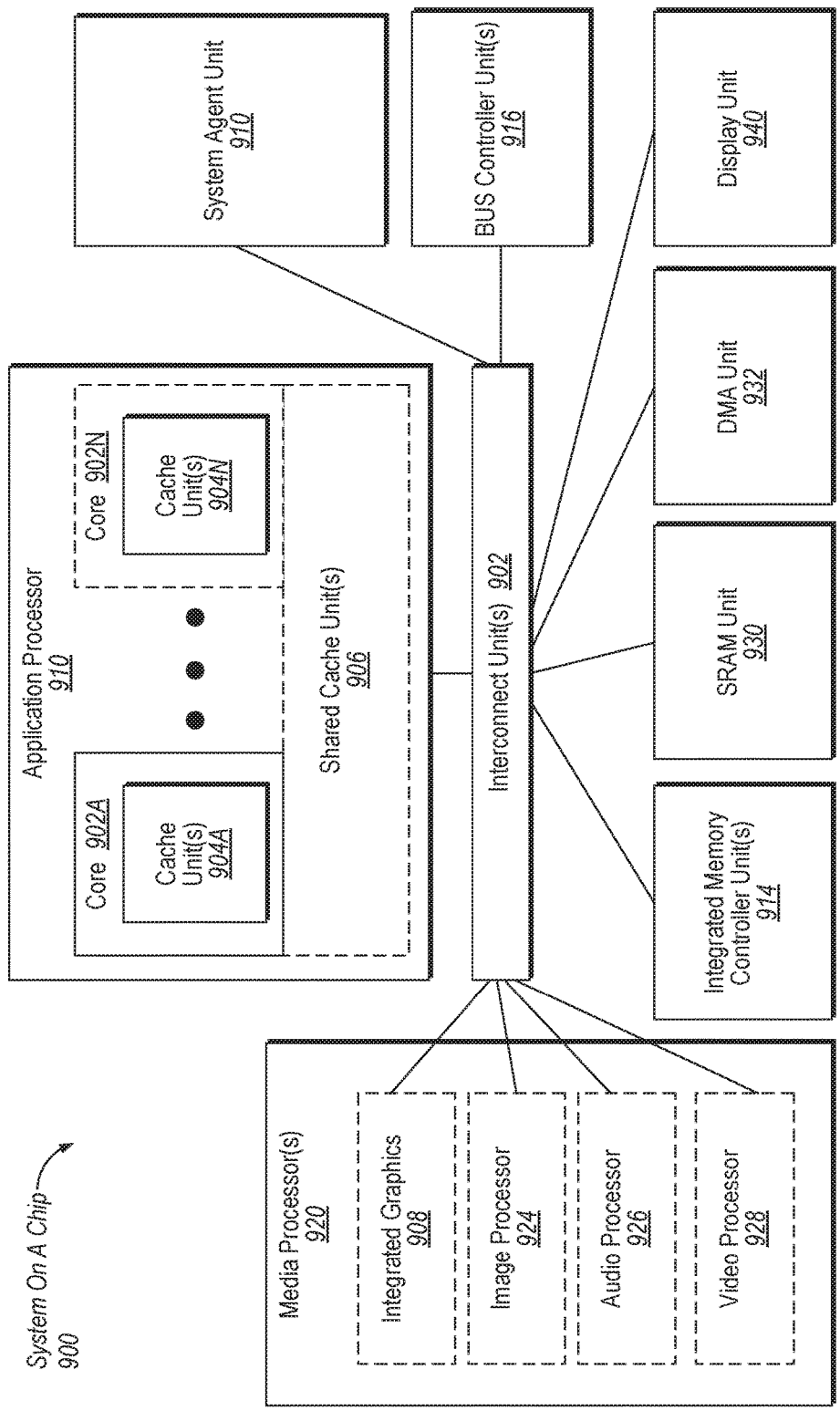
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, microarchitectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as that described above in connection with FIGS. 5 and 7. In addition. CL 872, 882 may also include I/O control logic. FIG. 8 illustrates that the memories 832, 834 are coupled to the CL 872, 882, and that I/O devices 814 are also coupled to the control logic 872, 882. Legacy I/O devices 815 are coupled to the chipset 890.

Referring now to FIG. 9, shown is a block diagram of a SoC 900 in accordance with an embodiment of the present invention. Similar elements in FIG. 5 bear like reference numerals. Also, dashed lined boxes are features on more advanced SoCs. In FIG. 9, an interconnect unit(s) 902 is coupled to: an application processor 910 which includes a set of one or more cores 902A-N and shared cache unit(s) 906; a system agent unit 910; a bus controller unit(s) 916: an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
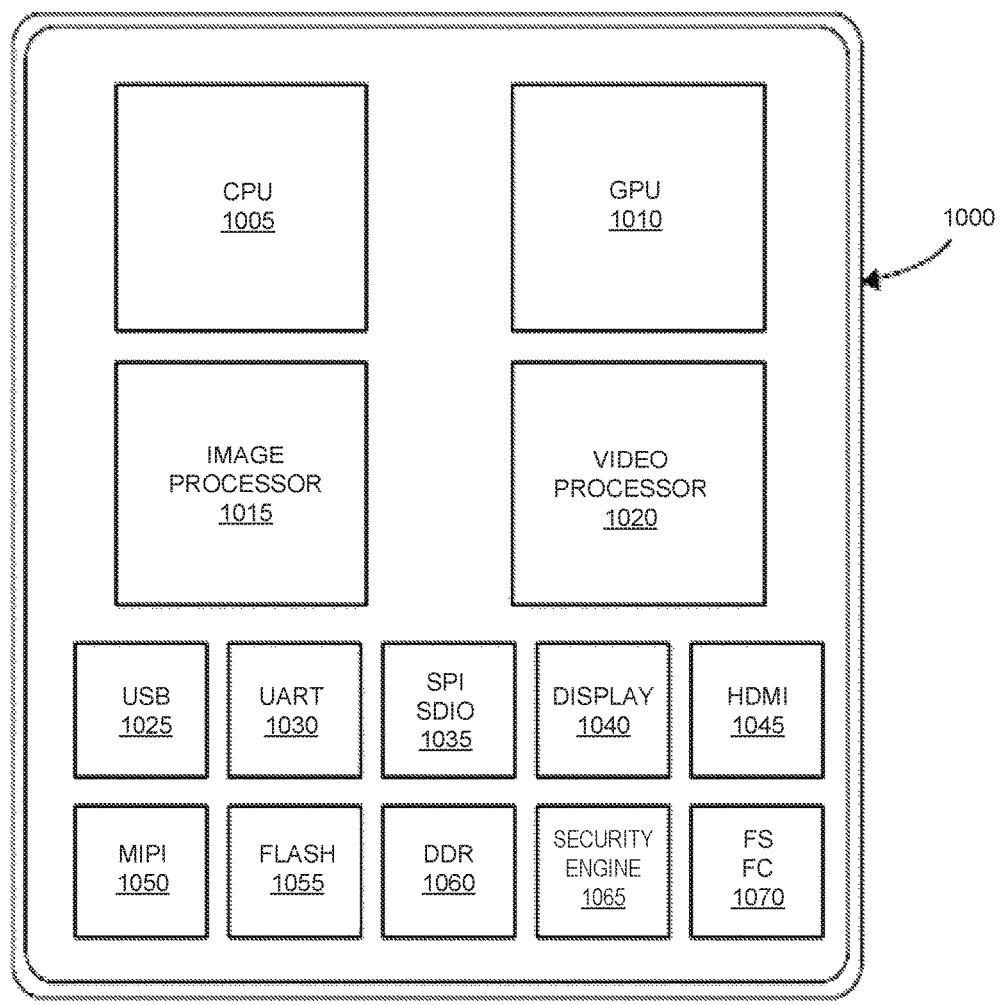
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I2S/I2C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
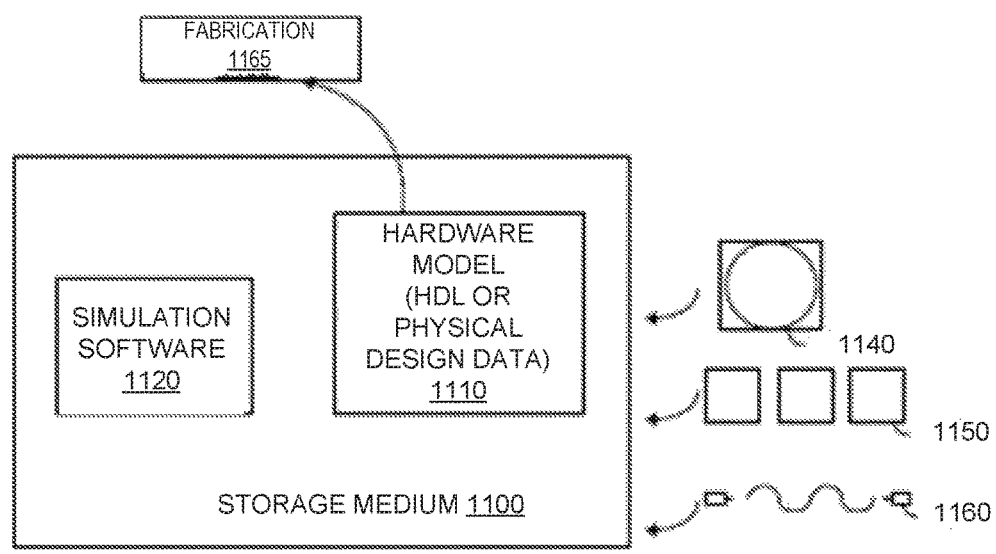
FIG. 11 is a block diagram of an IP core development system according to one embodiment.

FIG. 11 shows a block diagram illustrating the development of IP cores according to one embodiment. Storage 1130 includes simulation software 1120 and/or hardware or software model 1110. In one embodiment, the data representing the IP core design can be provided to the storage 1130 via memory 1140 (e.g., hard disk), wired connection (e.g., internet) 1150 or wireless connection 1160. The IP core information generated by the simulation tool and model can then be transmitted to a fabrication facility where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
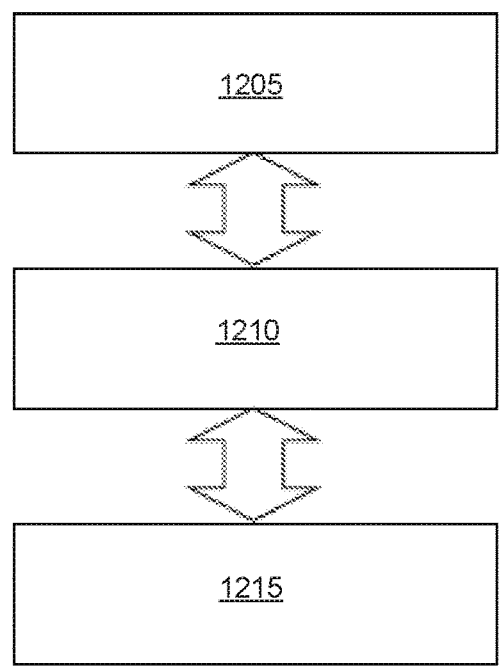
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to be executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
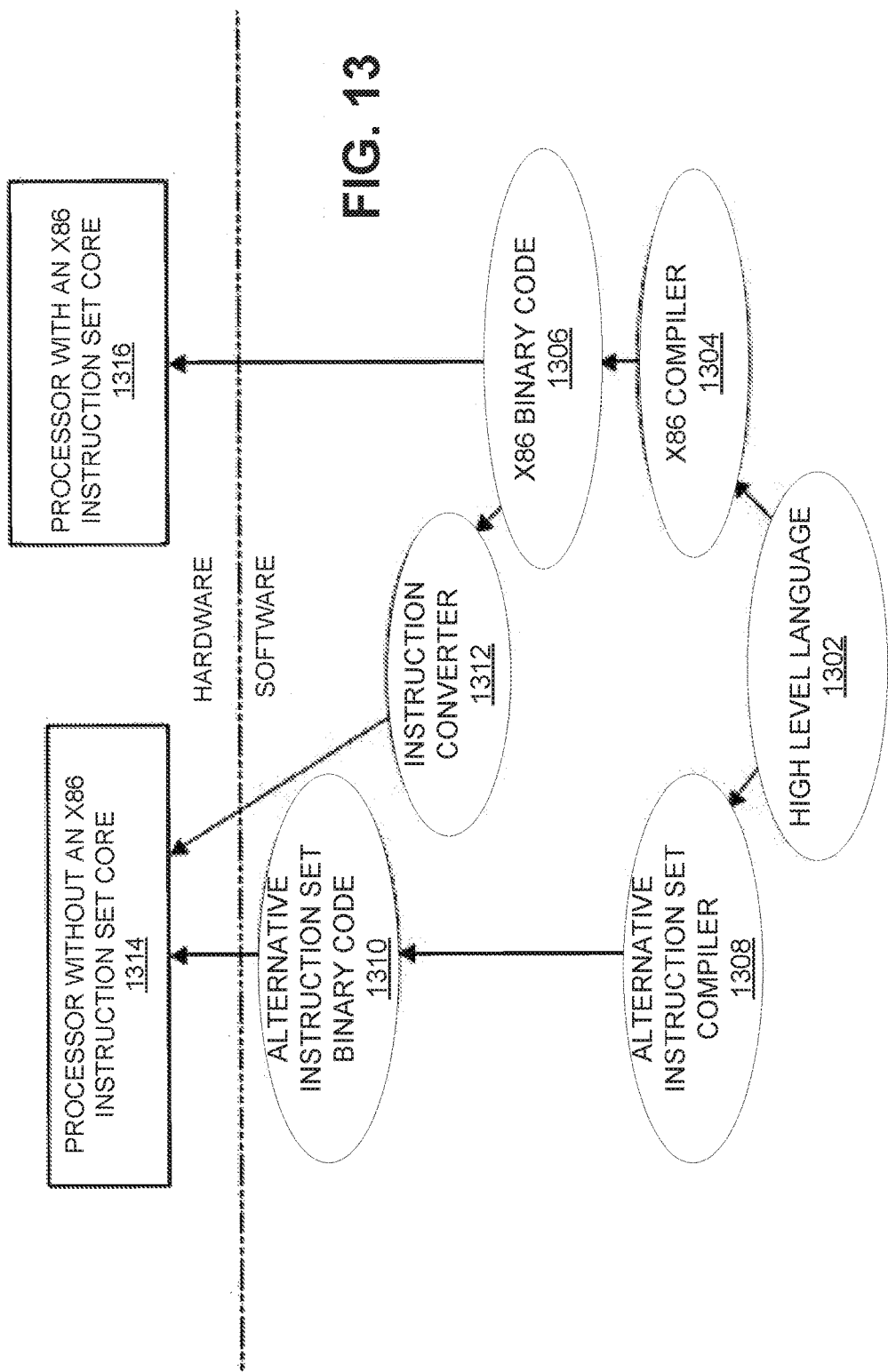
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Figure 14:
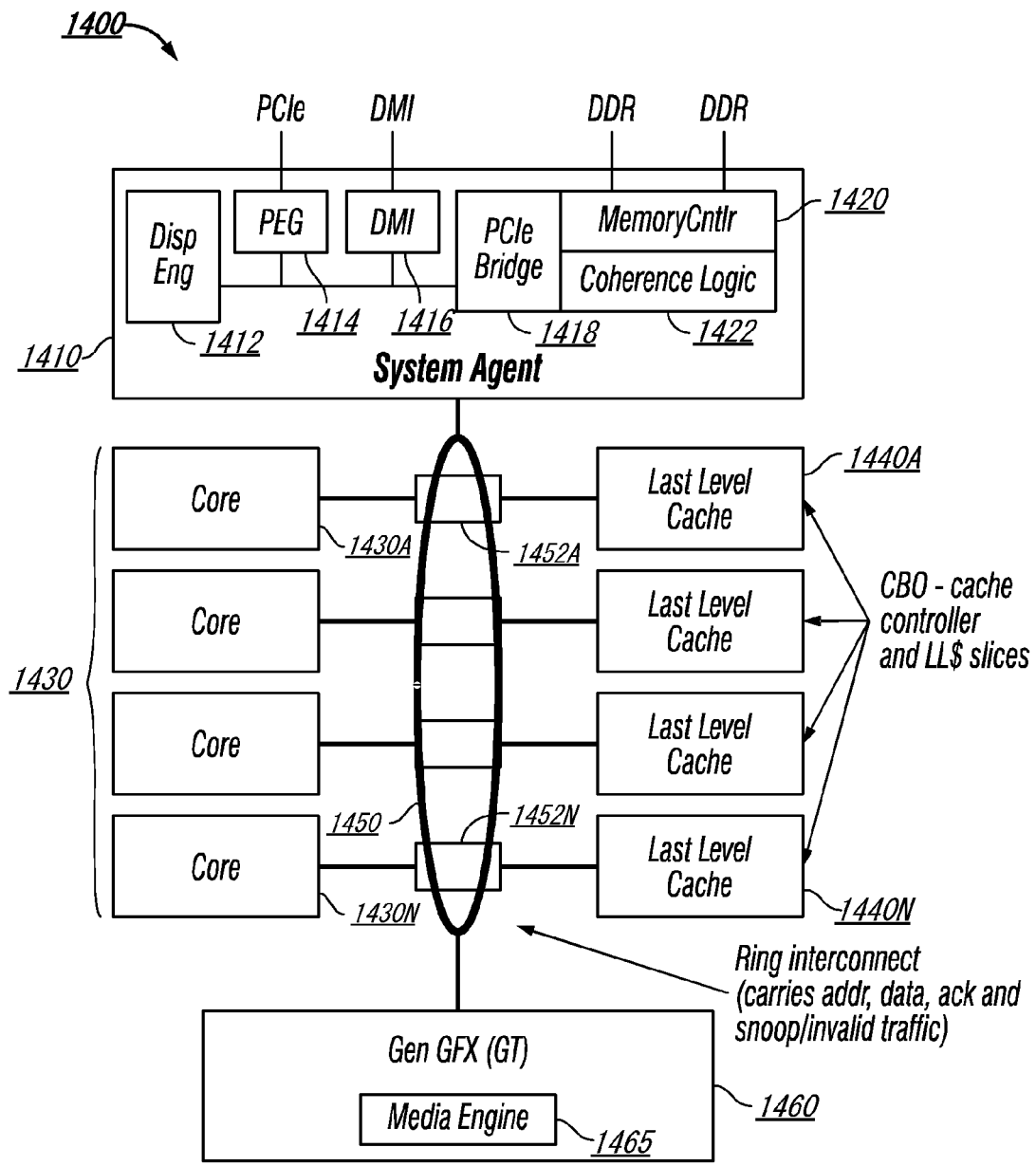
FIG. 14 illustrates another embodiment of a block diagram for a computing system including a multicore processor.

Referring now to FIG. 14, shown is a block diagram of an embodiment of a multicore processor. As shown in the embodiment of FIG. 14, processor 1400 includes multiple domains. Specifically, a core domain 1430 includes a plurality of cores 1430A-1430N, a graphics domain 1460 includes one or more graphics engines having a media engine 1465, and a system agent domain 1410.

In various embodiments, system agent domain 1410 handles power control events and power management, such that individual units of domains 1430 and 1460 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1430 and 1460 may operate at different voltage and/or power, and furthermore the individual units within the domains each potentially operate at an independent frequency and voltage. Note that while three domains are shown, the scope of the present disclosure is not limited in this regard and additional domains may be present in other embodiments.

As shown, each core 1430 further includes low level caches in addition to various execution units and additional processing elements. Here, the various cores are coupled to each other and to a shared cache memory that is formed of a plurality of units or slices of a last level cache (LLC) 1440A-1440N; these LLCs often include storage and cache controller functionality and are shared amongst the cores, as well as potentially among the graphics engine too.

As seen, a ring interconnect 1450 couples the cores together, and provides interconnection between the core domain 1430, graphics domain 1460 and system agent circuitry 1410, via a plurality of ring stops 1452A-1452N, each at a coupling between a core and LLC slice. As seen in FIG. 14, interconnect 1450 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1410 includes display engine 1412 which is to provide control of and an interface to an associated display. System agent domain 1410 may include other units, such as: an integrated memory controller 1420 that provides for an interface to a system memory (e.g., a DRAM implemented with multiple DIMMs; coherence logic 1422 to perform memory coherence operations. Multiple interfaces may be present to enable interconnection between the processor and other circuitry. For example, in one embodiment at least one direct media interface (DMI) 1416 interface is provided as well as one or more PCIe™ interfaces 1414. The display engine and these interfaces typically couple to memory via a PCIe™ bridge 1418. Still further, to provide for communications between other agents, such as additional processors or other circuitry, one or more other interfaces (e.g. the Intel® Quick Path Interconnect (QPI) fabric) may be provided.

Figure 15:
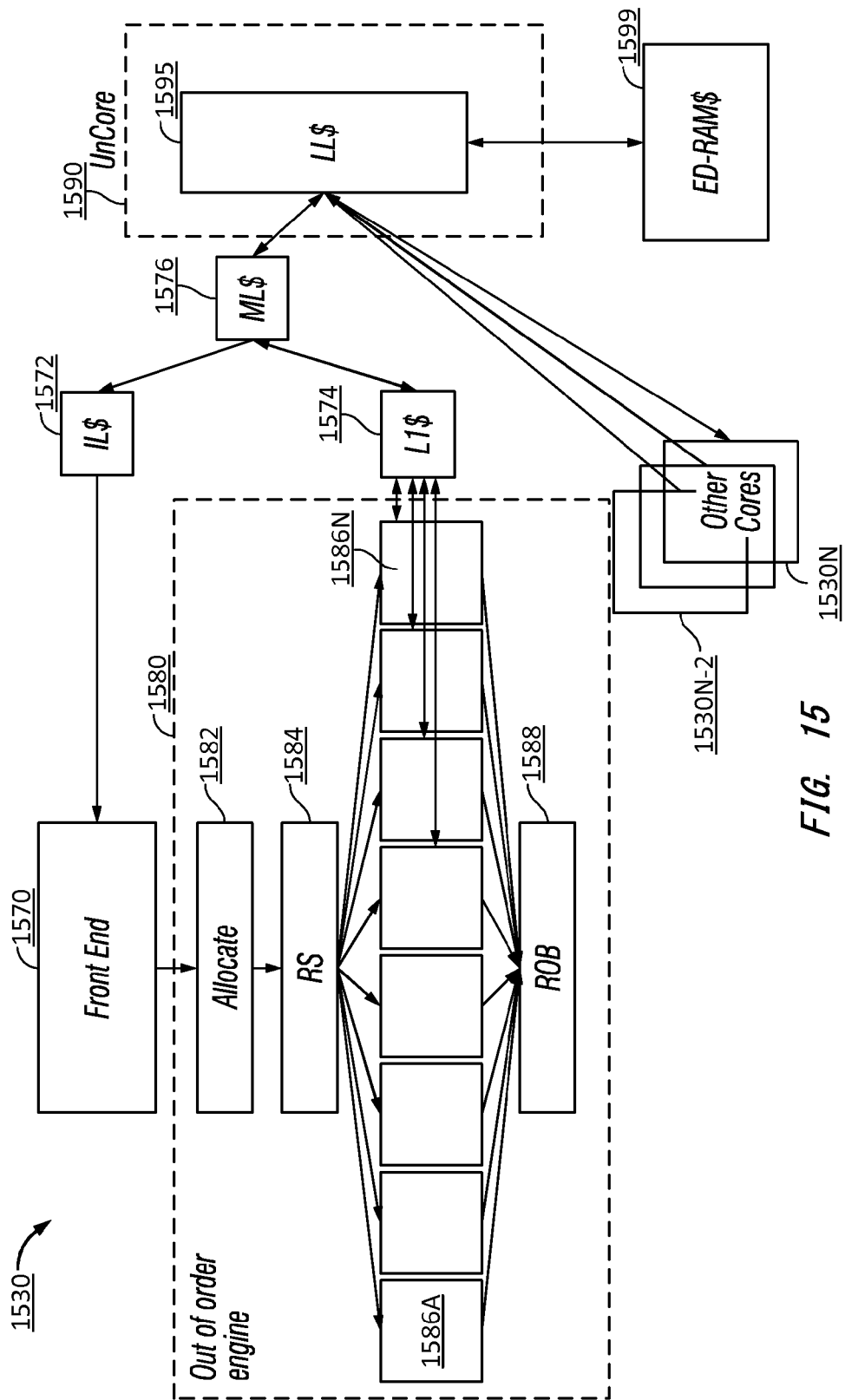
FIG. 15 illustrates an embodiment of a block diagram for a processor.

Referring now to FIG. 15, shown is a block diagram of a representative core; specifically, logical blocks of a back-end of a core, such as core 1430 from FIG. 14. In general, the structure shown in FIG. 15 includes an out-of-order processor that has a front end unit 1570 used to fetch incoming instructions, perform various processing (e.g. caching, decoding, branch predicting, etc.) and passing instructions/operations along to an out-of-order (OOO) engine 1580. OOO engine 1580 performs further processing on decoded instructions.

Specifically in the embodiment of FIG. 15, out-of-order engine 1580 includes an allocate unit 1582 to receive decoded instructions, which may be in the form of one or more micro-instructions or uops, from front end unit 1570, and allocate them to appropriate resources such as registers and so forth. Next, the instructions are provided to a reservation station 1584, which reserves resources and schedules them for execution on one of a plurality of execution units 1586A-1586N. Various types of execution units may be present, including, for example, arithmetic logic units (ALUs), load and store units, vector processing units (VPUs), floating point execution units, among others. Results from these different execution units are provided to a reorder buffer (ROB) 1588, which take unordered results and return them to correct program order.

Still referring to FIG. 15, note that both front end unit 1570 and out-of-order engine 1580 are coupled to different levels of a memory hierarchy. Specifically shown is an instruction level cache 1572, that in turn couples to a mid-level cache 1576 that in turn couples to a last level cache 1595. In one embodiment, last level cache 1595 is implemented in an on-chip (sometimes referred to as uncore) unit 1590. As an example, unit 1590 is similar to system agent 1410 of FIG. 14. As discussed above, UnCore 1590 communicates with system memory 1599, which, in the illustrated embodiment, is implemented via ED RAM. Note also that the various execution units 1586 within out-of-order engine 1580 are in communication with a first level cache 1574 that also is in communication with mid-level cache 1576. Note also that additional cores 1530N-2-1530N can couple to LLC 1595. Although shown at this high level in the embodiment of FIG. 15, understand that various alterations and additional components may be present.

Figure 16:
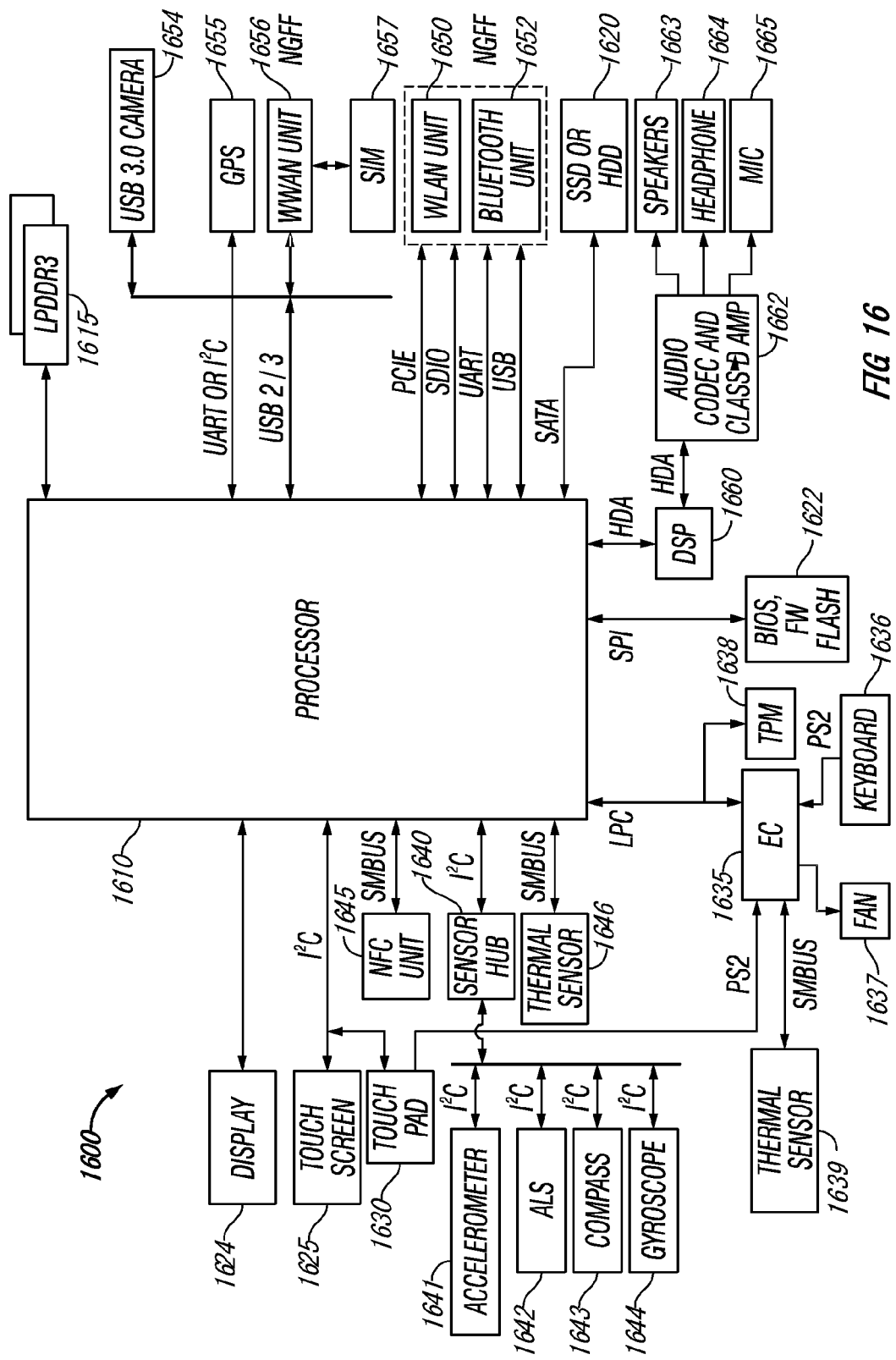
FIG. 16 illustrates another embodiment of a block diagram for a computing system.

Referring now to FIG. 16, a block diagram of components present in a computer system in accordance with an embodiment of the present invention is illustrated. As shown in FIG. 16, system 1600 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 16 is intended to show a high level view of many components of the computer system. However, it is to be understood that some of the components shown may be omitted, additional components may be present, and different arrangement of the components shown may occur in other implementations. As a result, embodiments of the invention described above may be implemented in any portion of one or more of the interconnects illustrated or described below.

As seen in FIG. 16, a processor 1610, in one embodiment, includes a microprocessor, multi-core processor, multi-threaded processor, an ultra low voltage processor, an embedded processor, or other known processing element. In the illustrated implementation, processor 1610 acts as a main processing unit and central hub for communication with many of the various components of the system 1600. As one example, processor 1600 is implemented as a system on a chip (SoC). As a specific illustrative example, processor 1610 includes a processor having the Intel® Architecture Core™, such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1610 in one implementation will be discussed further below to provide an illustrative example.

Processor 1610, in one embodiment, communicates with a system memory 1615. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (IP). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may also couple to processor 1610. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 16, a flash device 1622 may be coupled to processor 1610, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in an mSATA or NGFF slot. As an example, an SSD has a capacity ranging from 120 GB-1TB.

Various input/output (IO) devices may be present within system 1600. Specifically shown in the embodiment of FIG. 16 is a display 1624 which may be a high definition LCD or LED panel configured within a lid portion of the chassis. This display panel may also provide for a touch screen 1625, e.g., adapted externally over the display panel such that via a user's interaction with this touch screen, user inputs can be provided to the system to enable desired operations, e.g., with regard to the display of information, accessing of information and so forth. In one embodiment, display 1624 may be coupled to processor 1610 via a display interconnect that can be implemented as a high performance graphics interconnect. Touch screen 1625 may be coupled to processor 1610 via another interconnect, which in an embodiment can be an I$^2$C interconnect. As further shown in FIG. 16, in addition to touch screen 1625, user input by way of touch can also occur via a touch pad 1630 which may be configured within the chassis and may also be coupled to the same I$^2$C interconnect as touch screen 1625.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., the Gorilla Glass™ glass and coating or the Gorilla Glass 2™ glass and coating) for low friction to reduce "finger burn" and avoid "finger skipping." To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1610 in different manners. Certain inertial and environmental sensors may couple to processor 1610 through a sensor hub 1640, e.g., via an I$^2$C interconnect. In the embodiment shown in FIG. 16, these sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, is realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be the Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 16, various peripheral devices may couple to processor 1610 via a low pin count (LPC) interconnect. In the embodiment shown, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect. However, understand the scope of the present disclosure is not limited in this regard and secure processing and storage of secure information may be in another protected location such as a static random access memory (SRAM) in a security coprocessor, or as encrypted data blobs that are decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via a SMBus. Note that via this NFC unit 1645, devices in close proximity to each other can communicate. For example, a user can enable system 1600 to communicate with another (e.g.) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 16, additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to the Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present. Note that in the embodiment shown in FIG. 16, WWAN unit 1656 and an integrated capture device such as a camera module 1654 may communicate via a given USB protocol such as a USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with the WiFi™ 802.11ac solution (e.g., add-in card that is backward compatible with IEEE 802.11abgn) with support for the Windows® 8 CS. This card can be configured in an internal slot (e.g., via an NGFF adapter). An additional module may provide for Bluetooth capability (e.g., Bluetooth 4.0 with backwards compatibility) as well as the Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for the Wi-Fi™ technology in accordance with the 802.11x standards, the Bluetooth® technology, WWAN, NFC and GPS, enabling seamless transition from the Wi-Fi™ network radio to WWAN radio, wireless gigabit (WiGig™) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665 which in an embodiment can be implemented via dual array microphones (such as a digital microphone array) to provide for high quality audio inputs to enable voice-activated control of various operations within the system. Note also that audio outputs can be provided from amplifier/CODEC 1662 to a headphone jack 1664. Although shown with these particular components in the embodiment of FIG. 16, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1610 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1635. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 16, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, the Intel® Anti-Theft Technology, the Intel® Identity Protection Technology, the Intel® Trusted Execution Technology (TXT), and the Intel® Manageability Engine Technology along with secure user interfaces such as a secure keyboard and display.

Figure 17:
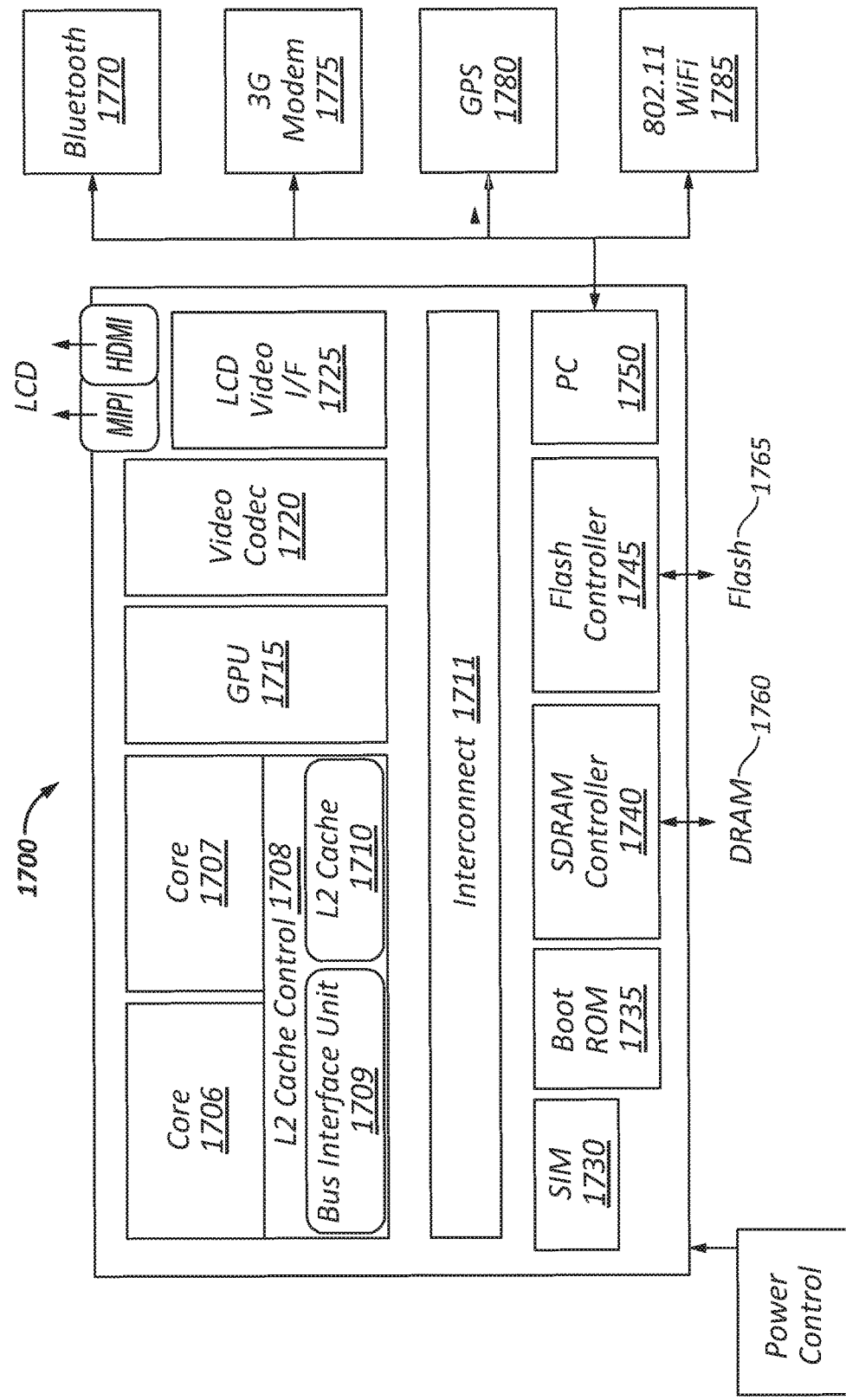
FIG. 17 illustrates another embodiment of a block diagram for a computing system.

Turning next to FIG. 17, an embodiment of a system on-chip (SOC) design in accordance with embodiments of the invention is depicted. As an illustrative example, SOC 1700 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network.

Here, SOC 1700 includes 2 cores—1706 and 1707. Similar to the discussion above, cores 1706 and 1707 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1706 and 1707 are coupled to cache control 1708 that is associated with bus interface unit 1709 and L2 cache 1710 to communicate with other parts of system 1700. Interconnect 1711 includes an on-chip interconnect, such as an IOSF, AMBA, or other interconnects discussed above, which can implement one or more aspects of the described disclosure.

Interconnect 1711 provides communication channels to the other components, such as a Subscriber Identity Module (SIM) 1730 to interface with a SIM card, a boor rom 1735 to hold boot code for execution by cores 1706 and 1707 to initialize and boot SOC 1700, a SDRAM controller 1740 to interface with external memory (e.g. DRAM 1760), a flash controller 1745 to interface with non-volatile memory (e.g. Flash 1765), a peripheral control 1750 (e.g. Serial Peripheral Interface) to interface with peripherals, video codecs 1720 and Video interface 1725 to display and receive input (e.g. touch enabled input), GPU 1715 to perform graphics related computations, etc. Any of these interfaces may incorporate aspects of the embodiments described herein.

In addition, the system illustrates peripherals for communication, such as a Bluetooth module 1770, 3G modem 1775, GPS 1780, and WiFi 1785. Note as stated above, a UE includes a radio for communication. As a result, these peripheral communication modules may not all be included. However, in a UE some form of a radio for external communication should be included.

The embodiments described below are directed to a mechanism for continuous automatic tuning of code regions. The mechanism can be used for a code region to identify and use an optimal hardware (HW) configuration for the code region. As described above, processor parameters can be set at manufacturing, at system boot time or at runtime, and can be permanently set to be compatible with a wide variety of applications.

The embodiments described below implement two new instructions that can be used to: 1) demarcate a code region for measurement (e.g., instructions-per-cycle (IPC) calculation, power-consumption metric, or the like); and/or 2) automatically adjust the tunable parameters for the demarcated region by calculating the measurement (e.g., IPC) of the code region for different sets of tunable parameters and selecting a set of tunable parameters with the highest measurement (e.g., highest IPC) or, in some cases, the lowest measurements (e.g., lowest energy consumption or lowest power consumption). Automatically adjusting and automatically tuning, as used herein, indicate that the tunable parameters for the demarcated region can be adjusted without user intervention to make those adjustments.

Figure 18:
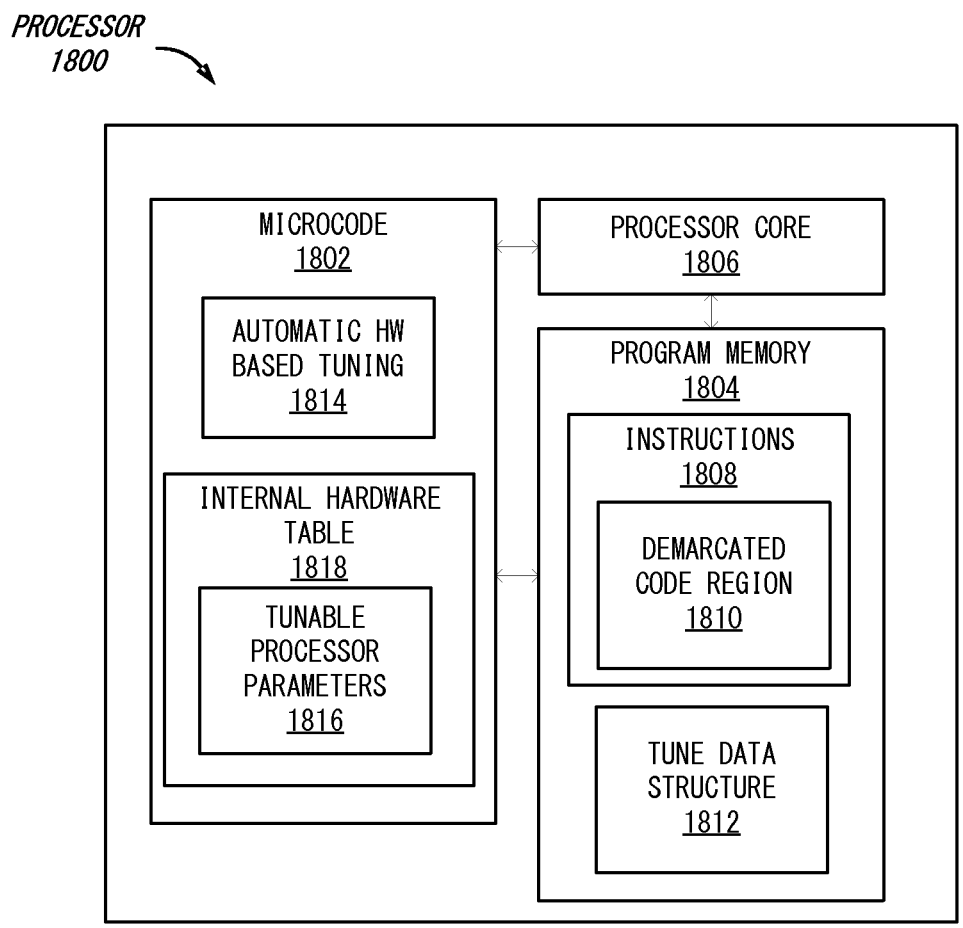
FIG. 18 is a block diagram of a processor for continuous automatic tuning of code regions according to one embodiment.

FIG. 18 is a block diagram of a processor 1800 for continuous automatic tuning of code regions according to one embodiment. The processor 1800 includes microcode 1802, a processor core 1806 and program memory 1804. The microcode 1802 may be stored in the microcode ROM as described herein, and may include processing logic to execute an automatic hardware-based tuning algorithm 1814, and an internal hardware table 1818 storing tunable processor parameters 1816. The program memory 1804 stores instructions 1808, including a demarcated code region 1810, and a tune data structure 1812. The processor core 1806 is configured to execute the microcode 1802 and the instructions 1808 as described in more detail below. A demarcated code region 1810 can be a piece of code of any size. The demarcated code region 1810 can be part of a main program or can be set outside a loop or other locations in the code.

During operation, the processor core 1806 executes the instructions 1808 and identifies the demarcated code region 1810 as described in more detail below. The code region 1810 can be demarcated by a first instruction that demarcates a beginning of the code region 1810 and a second instruction that demarcates an end of the code region 1810. The processor core 1806 also executes the microcode 1802 to calculate metrics associated with the execution of the demarcated code region 1810 for automatic tuning of tunable processor parameters 1816, as described in more detail below. The automatic hardware-based tuning algorithm 1814 of the microcode 1802 can use a tune data structure 1812 to automatically tune the tunable processor parameters 1816 for the demarcated code region 1810. The automatic hardware-based tuning algorithm 1814 performs automatic hardware based tuning at an application runtime. In one embodiment, the tunable processor parameters 1816 are stored in an internal hardware table 1818. The internal hardware table 1818 can store configuration bit patterns with each bit of the configuration bit pattern enabling or disabling one of the configurable features, like a L1 IP prefetching feature). Alternatively, the tunable processor parameters 1816 can be stored in other locations or using other techniques than an internal hardware table 1818. In one embodiment, the first instruction and second instruction can be used by a programmer to demarcate the code region within the instructions 1808 (e.g., within the program file) to be tuned (e.g., demarcated code region 1810). For example, the following is an example of the demarcated code region 1810:

```
TUNABLE_REGION_BEGIN address_of (tune_data_structure)
//
// code to be tuned
//
TUNABLE_REGION_END address_of (tune_data_structure)
```

The first instruction and second instruction of the demarcated code regions 1810 call the tune data structure 1812 (tune_data_structure). The tune data structure 1812 is a data structure (e.g., a file) organized in program memory 1804. The following is an example of the tune data structure 1812.

```
struct tune_data_structure {
    int configuration_bits;          // describes HW configuration, to use
    float best_configuration_IPC;    // best IPC found for this code region
    int best_configuration_bits;     // HW config that yields best IPC
    int start_icount;                // dynamic instr count at the start of region
    int start_cycle_count;           // dynamic cycle count at the start of region
    bool done_training;              // is training done
}
```

The internal hardware table 1818 may contain a limited number of configuration-bit patterns, such as 4-8. The configuration-bit patterns can be loaded into a configuration-bits field (e.g., configuration_bits), and a bit in the configuration-bits field indicate whether a given tunable parameter is enabled or disabled. As described above, some of the processor parameters may include: (1) Hardware (HW) prefetcher settings, including turning on or off some HW prefetchers; (2) Software (SW) prefetch instruction settings, including ignoring or honoring SW prefetch instructions; (3) Cache evict/replacement hints, including ignoring or honoring cache evict/replacement hints; (4) Cache sizes, including dynamically configuring the cache sizes; (5) Dynamic Random-Access Memory (DRAM) channels, including configuring DRAM page opening policies and buffer sizes; and (6) HW buffer size, including configuring various HW buffer sizes or HW structure sizes. The configuration-bit patterns may be used to enable or disable different combinations of tunable parameters of the processor. For example, the configuration-bit pattern may indicate that a feature, such as L1 IP prefetching, is enabled or disabled. It should be noted that the fields of the above tune data structure 1812 can be initialized to zero.

In one embodiment, the two instructions, TUNABLE_REGION_BEGIN and TUNABLE_REGION_END, are implemented as microcode flows that can access memory more than once. In one embodiment, the TUNABLE_REGION_BEGIN instruction loads the 'configuration_bits' field using operand 1 (which points to tune_data_structure). The microcode of the processor uses these bits to configure the processor parameters (e.g., to enable/disable L1 prefetcher). This instruction can also cause the processor 1800 to store the current value of INSTR_RETIRED performance counter to 'start_icount' field and the CORE_CYCLES performance counter to 'start_cycle_count' filed of the 'tune_data_structure. In a further embodiment, the TUNABLE_REGION_END instruction calculates the IPC value for the region demarcated between TUNABLE_REGION_BEGIN and TUNABLE_REGION_END using the following formula:

$$IPC=(INSTR\_RETIRED\sim start\_icount)/(CORE\_CYCLES-start\_cycle\_count)$$

If the calculated IPC is greater than 'best_configuration_IPC', the calculated IPC can be written to 'best_configuration_IPC' field and the 'configuration_bits' can be copied to 'best_configuration_bits' field. It should be noted that "best," as used in the naming of the various fields can be used to denote the highest metric, such as the highest IPC or other performance metrics, but can also be used to store values for the lowest metric, such as the lowest energy-consumption metric or the lowest power-consumption metric. Alternatively, other counter values may be used to track other measurements for other types of metric calculations.

In a further embodiment, if 'done_training' bit is false, this instruction picks the next configuration-bit patterns (from the internal HW table 1818) and writes that to 'configuration_bits' field. If there is no next configuration-bit pattern (it has explored all configuration-bit patterns), the done_training field is set (written 1), and the 'best_configuration_bits' field is copied on to 'configuration_bits' field, which can be read by the next TUNABLE_REGION_BEGIN instruction. This ends the training process which finds the best configuration. As described herein, references to the best configuration, such as denoted by the "best configuration-bits" field, may be the set of configuration parameters that results in the highest metric (e.g., IPC), such as described in the current example, but could also be the configuration that results in the lowest metric, such as the lowest power-consumption metric.

In a further embodiment, if 'done_training' bit is already set, this instruction compares the current IPC value with the 'best_configuration_IPC' already found in the training process. If the current IPC value is greater than the 'best_configuration_IPC' by a specified amount (e.g., 1.10× the best_configuration_IPC), the training process is restarted by making the 'done_training' bit false and writing the first configuration-bit pattern (read from the internal HW table 1818) to 'configuration_bits' field. The specified amount for restarting the training process can be set by a programmer, by a user, by a manufacturer, or by the like. The specified amount may be a retraining threshold. For example, retraining may occur when the difference between the current IPC value and the highest IPC value is greater than the retraining threshold. Re-training may be useful, for example, if changes in the operating environment lead to a different best configuration.

As described herein, the current approach is for a developer of the processor to pick one hardware configuration for the processor at manufacturing time for use in a large number of applications. For some current solutions, the customer may set the default hardware configuration. For example, high-performance-computing (HPC) customers often disable all HW prefetchers in BIOS even though some applications can benefit from them. The embodiments described herein allow multiple hardware configurations to be tested at runtime for each application. For instance, instead of HPC customers disabling all prefetchers in BIOS, this mechanism can be used to dynamically pick applicable prefetcher setting for each application. Although currently hardware can be configured to measured IPC, these hardware implements do not interact with instructions of an application, making it difficult for hardware to perform several IPC measurements for the same code region. This is because it is difficult for hardware to know the start and end point of the same code region. Therefore, these embodiments allow more precise measurements of IPC for tuning for specified code regions as compared to a hardware implementation.

In another embodiment, each application is allowed to have its own HW configuration (e.g., prefetcher setting) specifically tailored for that application, such as to optimize performance or optimize energy or power consumption. In some embodiments when the code region 1810 is threaded code, the tune data structure 1812 (e.g. 'tune_data_structure') is private to the thread (or should be accessed by one thread). In other embodiments, the demarcated code regions are nested, and each tunable code region has its own tune data structure 1812. In other embodiments, whenever there is an interrupt or exception, the processor 1800 can copy the value of CORE_CYCLES performance counter at the time of interrupt or exception to a special hardware register. If this register value is larger than the 'start_cycle_count' field of a given tunable region, then TUNABLE_REGION_END instruction may not calculate IPC for that region because the instruction count and cycle count may not be precise due to the interrupt or exception. In other embodiments, the processor 1800 can set a single valid bit (in an internal status register) when it enters a tunable region, and whenever there is an interrupt or exception, the processor 1800 can clear that valid bit. If this valid bit is clear at the end of the tunable region, then TUNABLE_REGION_END instruction may not calculate IPC for that region because the instruction count and cycle count may not be precise due to the interrupt or exception.

In another embodiment, if it is determined that a demarcated code region is unstable because it needs constant tuning, the automatic tuning of the code region can be disabled. In this embodiment, the tune data structure 1812 includes an additional 'disabled' field. In another embodiment, the automatic tuning can be performed when the code region is sufficiently large for a measurement to be taken. For example, if the region is too small (e.g., less than 100,000 instructions), the code region can be ignored. In another embodiment, the automatic tuning can be sensitive to changes in the processor states. For example, the automatic tuning algorithm can track changes of frequency of the processor or changes in the processor states (P states), and can restart the measurements when the frequency changes or the P state changes, since these changes may affect the measurements. It should be noted that the new instructions can be converted to no-ops in architectures that do not support these instructions in order to avoid these instructions from becoming a legacy burden in the future.

In another embodiment, the processor 1800 includes a memory to store a set of instructions and microcode 1802, and a processor core 1806, coupled to the memory, to execute the set of instructions and the microcode 1802 and to perform automatic tuning of processor parameters of the processor. The processor 1800 is configured to identify a code region of the set of instructions that is demarcated for automatic tuning of tunable parameters of the processor 1800. The processor 1800 executes the code region using a first set of tunable parameters and calculates, by the microcode 1802, a first metric of the code region that uses first set. The processor 1800 executes the code region using a second set of tunable parameters and calculates, using the microcode 1802, a second metric of the code region that uses the second set. The processor 1800 selects, using the microcode 1802, a third set of tunable parameters for the code region from the first set and the second set based on the first metric and the second metric. In one embodiment, the processor 1800 selects one of the first set and the second set. The selected third set may represent a best configuration, such as a set of configuration parameters that results in the highest performance for the code region or a set of configuration parameters that results in the lowest metric for the code region, such as for power or energy metrics. In another embodiment, the processor 1800 selects portions of the first set and the second set. In response to the selection, the processor 1800 applies the third set of tunable parameters to change a system configuration of the processor 1800 for subsequent execution of the code region.

In some embodiments, the first metric, second metric, and subsequent metrics are performance metrics that represent performance of the processor 1800. In one embodiment, the performance metric is IPC calculations. In another embodiment, the performance metric is the number of cycles for the code region. For example, in another embodiment, the processor 1800 is configured to execute the microcode 1802 to identify a first instruction that demarcates a beginning of the code region and tracks counter values for cycle count and instruction count while the code region is executed. The microcode 1802 identifies a subsequent instruction that demarcates an end of the code region. The microcode 1802 calculates a performance metric from the counter values after the identifying the subsequent instruction. The microcode 1802 determines if the performance metric exceeds a highest performance metric stored for the currently tested code region (after the identifying the subsequent instruction) and assigns the performance metric as the highest performance metric when the performance metric exceeds the highest performance metric. It should be noted that the highest performance metric may be initialized to zero initially. Also, the highest performance metric may be the highest performance metric from the sets of configuration parameters (e.g., configuration bit pattern) that have been tested for the code region so far. In other embodiments, the metrics are power metrics that represent power efficiency of the processor 1800, such as power consumption metrics. In other embodiments, the metrics are energy metrics that represent energy efficiency of the processor 1800, such as energy-consumption metrics.

It should be noted that these embodiments are also applicable to automatic tuning for power efficiency. The same methodology can be applied; however, instead of measuring performance metrics, such as IPC, the automatic hardware based tuning algorithm can measure power consumption and use the measured power consumption to pick the lowest power configuration for the code region.

Figure 19:
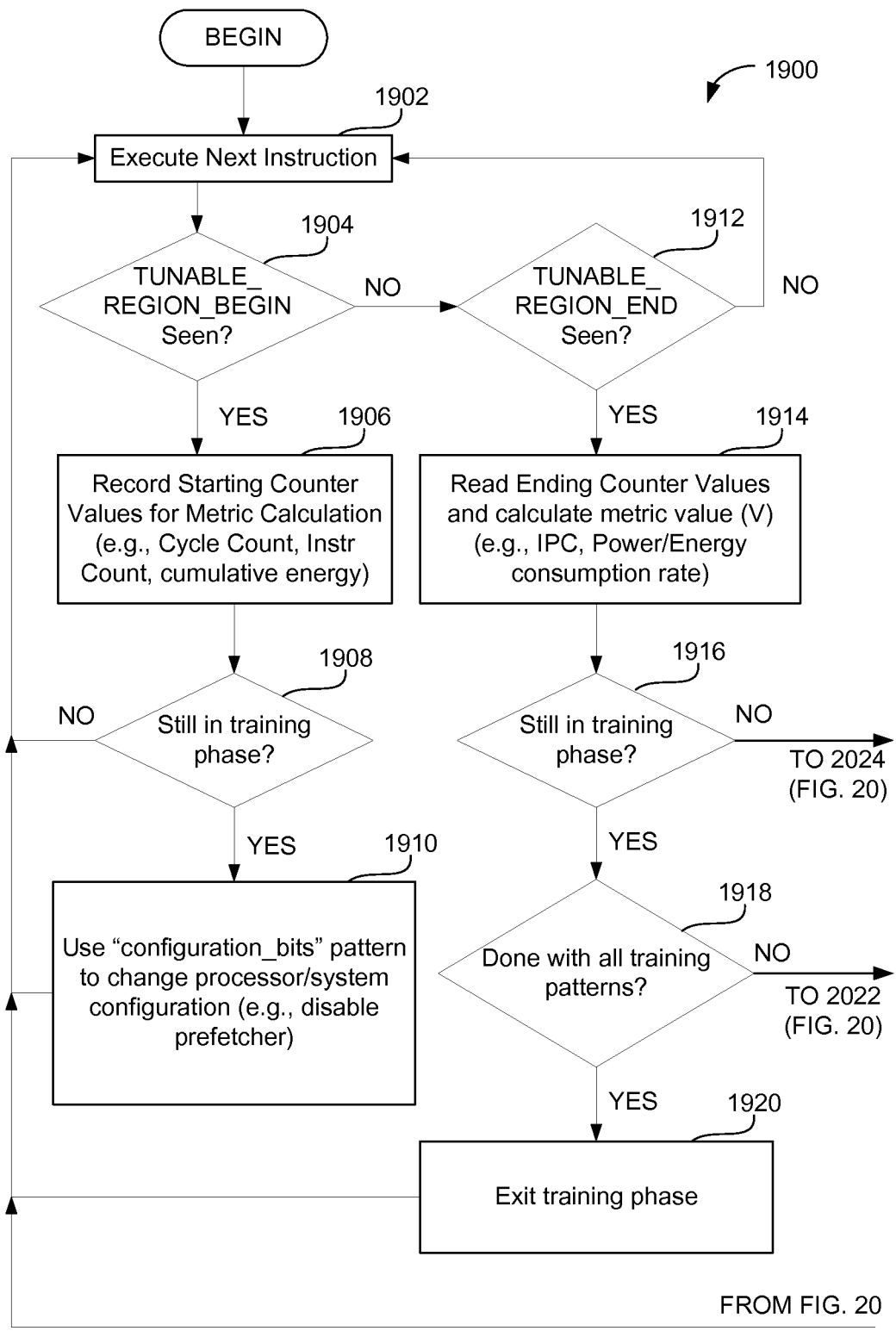
FIG. 19 is a flow diagram of a method for continuous automatic tuning of code regions according to one embodiment.
Figure 20:
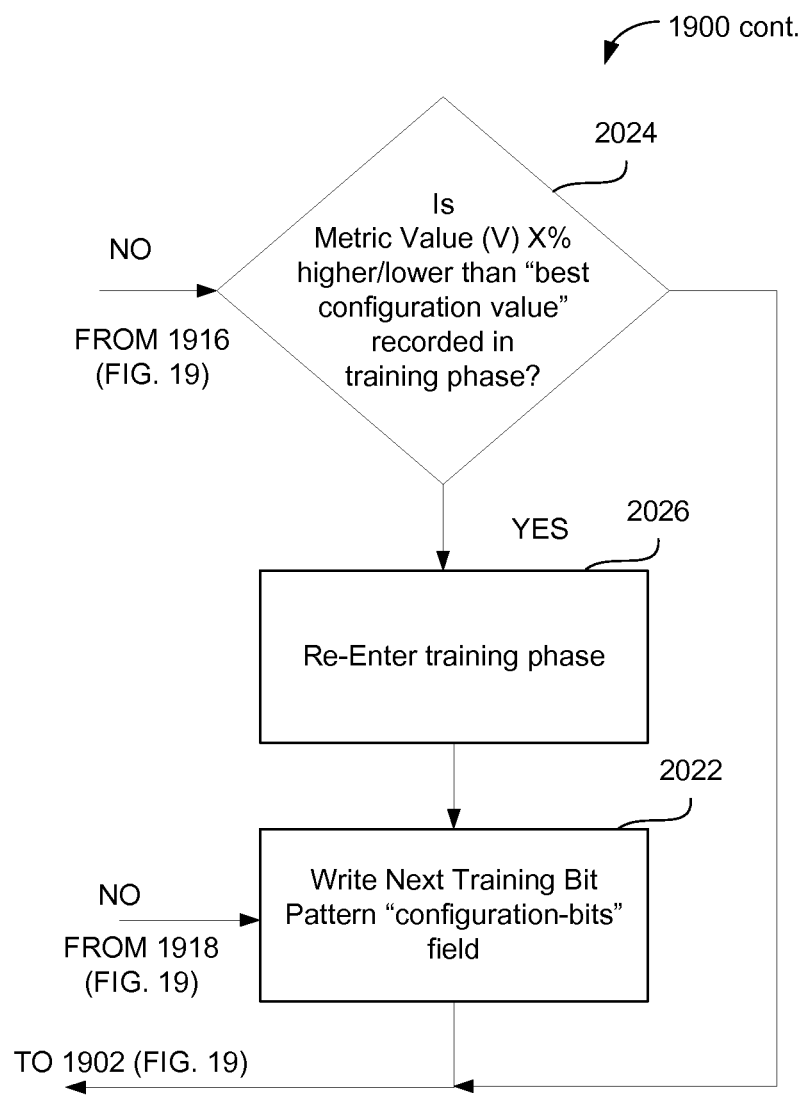
FIG. 20 is a flow diagram of the method for continuous automatic tuning of code regions of FIG. 19 according to one embodiment.

FIG. 19 and FIG. 20 are flow diagrams of a method 1900 for continuous automatic tuning of code regions according to one embodiment. The method 1900 may be performed by processing logic that may comprise hardware (circuitry, dedicated logic, etc.), software (such as is run on a general purpose computing system or a dedicated machine), firmware (embedded software), or any combination thereof. In one embodiment, the processor 1800 of FIG. 18 performs the method 1900. In another embodiment, the automatic hardware-based tuning algorithm 1814 performs the method 1900. Alternatively, other components of the processors described herein perform some or all of the operations of method 1900.

Referring to FIG. 19, the method 1900 begins with processing logic executing the next instruction (block 1902) (e.g., an arbitrary instruction of a program being executed). The processing logic determines if the next instruction is the TUNABLE_REGION_BEGIN instruction (block 1904). If so, the processing logic records starting counter values for the metric calculation (e.g., cycle count, instruction count, cumulative energy) (block 1906), and proceeds to block 1908. If the determination at block 1904 is negative, the processing logic proceeds to block 1912 described below. At block 1908, the processing logic determines if still in the training phase (training field is set to false). If so, the processing logic uses the "configuration-bit pattern" to change the system configuration (or processor configuration, such as disabling prefetcher (block 1910), and returns to block 1902 for the next instruction. If the determination at block 1908 is negative, the processing logic returns to block 1902 and does not perform block 1910.

At block 1912, the processing logic determines if the instruction is the TUNABLE_REGION_END instructions. If not, the processing logic returns to block 1902; otherwise, the processing logic records the ending counter values (e.g., cycle count, instruction count, cumulative energy) and calculates a metric value (V) (e.g., IPC, power consumption rate, or the like) (block 1914). At block 1916, the processing logic determines if still in the training phase (not done with all training patterns). If so, the processing logic determines if all the training patterns (also referred to as "configuration-bit patterns"), stored in the internal hardware table, have been tested (block 1928). If so, the processing logic exits the training phase (block 1920) and returns to block 1902 to the next instruction. If not done with all the training patterns at block 1918, the processing logic writes the next training pattern to the "configuration_bits" field (block 2026 of FIG. 20), and returns to block 1902 (FIG. 19). If at block 1916 the processing logic determines that it is done with training, the processing logic determines if the metric value (V) exceeds a current value of the best configuration (e.g., set of parameters with the highest IPC for the code region) by a specified value (e.g., X % better) recorded in the training phase (block 2024 of FIG. 20). If so, the processing logic re-enters the training phase (block 2026 of FIG. 20), such as by setting a bit to enable training, writes the next configuration-bit pattern to the "configuration_bits" field at block 2022 (FIG. 20) and returns to block 1902 (FIG. 19). If the determination at block 2024 is negative, the processing logic returns to block 1902, skipping blocks 2026 and 2022. The method 1900 ends when there are no more instructions.

In another embodiment of the method, the processing logic identifies a code region demarcated for automatic tuning of processor parameters by microcode executing on a processor. The microcode automatically tunes the processor parameters for the code region as described below. The microcode automatically tunes the processor parameters without user intervention and can automatically tune the processor parameters at runtime of an application. Similarly, the microcode can automatically tune different processor parameters for different applications. In one embodiment, the microcode automatically tunes the processor parameters by executing the code region using different combinations of the processor parameters, and calculates a metric of the execution of the code region for each of the different combinations of the processor parameters. The microcode selects a set of processor parameters based on the metrics.

In a further embodiment, during a training phase, the processing logic identifies a first instruction that demarcates a beginning of the code region, and tracks counter values for cycle count and instruction count while the code region is executed. The processing logic identifies a subsequent instruction that demarcates an end of the code region. In response to the subsequent instruction, the processing logic calculates a performance metric from the counter values for the metric, determines if the performance metric is better than a highest performance metric (e.g., highest IPC for the tested code region), and assigns the performance metric as the highest performance metric when the performance metric exceeds the highest performance metric. In one embodiment, the metric is a performance metric, such as IPC, instruction count, or the like. When using the IPC, the processing logic calculates a number of instructions for the executed code region, calculates a number of cycles for the executed code region, and divides the number of instructions by the number of cycles. In a further embodiment, after the training phase, the processing logic determines whether the performance metric is greater than the current value of the highest performance metric by a specified amount. The processing logic re-enters the training phase when the performance metric is greater than the current value of the highest performance metric by the specified amount.

In another embodiment, the tunable parameters are stored as configuration-bit patterns in an internal hardware table in the microcode, where each of configuration bits of the configuration-bit pattern indicates whether a given tunable parameter is enabled or disabled. In this embodiment, the processing logic loads a configuration-bit pattern from the internal hardware table using a first operand that points to a data structure, stores a current value of a retired instruction performance counter to a start count field of the data structure and stores a current value of a core cycle performance counter to a start cycle count field of the data structure. In one embodiment, the processing logic identifies the subsequent instruction, computes an IPC calculation for the code region between the first instruction and the subsequent instruction. The processing logic writes the IPC calculation to a "best IPC" field of the data structure (e.g., highest IPC) when the IPC calculation is greater than a current value of the "best IPC" field, and copies the configuration bits of the configuration-bits field to a "best configuration-bits" field (e.g., configuration bits for the configuration bit pattern that resulting in the highest IPC value) of the data structure when the IPC calculation is greater than the current value of the best IPC field (e.g., highest IPC value). The best IPC field represents the highest IPC value measured for the code region and the best configuration-bits field represents the configuration bits that results in the highest IPC value measured in this example. In a further embodiment, the processing logic determines whether a training phase is done for the configuration-bit patterns stored in the internal hardware table, and selects a next configuration-bit pattern from the internal hardware table when the training phase is not done, writing the next configuration-bit pattern into the configuration-bits field. In a further embodiment, the processing logic determines whether the IPC calculation is greater than the current value of the "best IPC" field by a specified amount when the training phase is done and re-enters the training phase when the IPC calculation is greater than the current value of the "best IPC" field by the specified amount.

The metric may be other metrics, such as a power metric or energy metric. For example, the processing logic can measure a maximum power consumption of a code region or a cumulative energy consumption of a code region. Power is an instantaneous quantity, whereas energy is the cumulative power consumption, e.g., energy can be power consumption added over time. For example, in one embodiment, the metric is a power (or energy) metric, such as power (energy) consumption or the like. For example, the processing logic, during a training phase, identifies both the first instruction and the subsequent instruction like above, but tracks power (energy) measurements of the execution of the code region. In response to the subsequent instruction, the processing logic calculates a power-consumption (energy-consumption) metric for the code region being executed based on the tracked power measurements. The processing logic determines if the power-consumption (or energy-consumption) metric exceeds a lowest power-consumption (or energy-consumption) metric, and assigns the power-consumption metric as the lowest power-consumption (or energy consumption) metric when the power-consumption (energy consumption) metric exceeds than the lowest power-consumption metric.

The embodiments described herein allow processors to provide higher performance by allowing the processor to select the HW configuration that results in the highest performance to run a given code region (e.g., piece of code) without user intervention. For instance, situations under software prefetch instructions are beneficial to a program are hard to determine since software prefetch instructions may interact positively or negatively with cache, memory subsystem, and hardware prefetching. These embodiments can be used to enable SW prefetch instructions to do prefetching when it is actually beneficial in a given system. Same applies to evict instructions found on Many Integrated Core (MIC) architectures. In addition, these embodiments may allow a processor to be shipped with smaller structure sizes by default (for energy efficiency reasons) but give the opportunity for a program to ask for larger structure sizes when a program can truly benefit from larger structures. In particular, these embodiments could allow a program to request to be run on a higher performance processor in a heterogeneous environment. For instance, in a system where there are big cores and Atom cores, this mechanism can be used to move a demarcated piece of code to a big core from Atom core, if that piece of code benefits running on the big core. Further, these embodiments can provide just-in-time (JIT) compilers and runtimes to produce tunable code that can be automatically tuned by hardware.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task.

In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
   a memory to store a set of instructions; and
   a processor core coupled to the memory to execute the set of instructions, wherein the processor core is to:
   identify a code region of the set of instructions that is demarcated for automatic tuning of tunable parameters of the processor, wherein:
   the code region is demarcated by a tune data structure comprising a configuration-bit pattern to enable different combinations of the tunable parameters for system configurations of the processor, and
   the tunable parameters are parameters to enable different system configurations of the processor using one or more bits of the configuration-bit pattern;
   execute the code region using a first tunable parameter;
   calculate a first metric of the code region that uses the first tunable parameter;

execute the code region using a second tunable parameter;

calculate a second metric of the code region that uses the second tunable parameter;

select a third tunable parameter for the code region from the first and the second tunable parameters based on the first metric and the second metric; and execute the code region using the third tunable parameter, wherein execution of the code region using the third tunable parameter increases a performance of the processor, decreases power consumption of the processor, or both.

2. The processor of claim 1, wherein the first metric and the second metric are performance metrics that represent performance of the processor.

3. The processor of claim 1, wherein the first metric and the second metric are instructions-per-cycle (IPC) calculations.

4. The processor of claim 1, wherein the first metric and the second metric are at least one of power-consumption metrics or energy-consumption metrics that represent power efficiency or energy efficiency of the processor.

5. The processor of claim 1, wherein the processor is further to execute microcode to:
    identify a first instruction that demarcates a beginning of the code region;
    track counter values for cycle count and instruction count while the code region is executed;
    identify a subsequent instruction that demarcates an end of the code region;
    calculate a performance metric from the counter values after identification of the subsequent instruction;
    determine if the performance metric exceeds a highest performance metric after identification of the subsequent instruction; and
    assign the performance metric as the highest performance metric when the performance metric exceeds the highest performance metric.

6. The processor of claim 5, wherein the first instruction and the subsequent instruction are implemented as microcode flows.

7. The processor of claim 1, wherein the tunable parameters are stored as configuration-bit patterns in an internal hardware table in microcode, wherein each bit of each of the configuration-bit patterns indicates whether a given tunable parameter is enabled or disabled.

8. The processor of claim 7, wherein the processor is to identify a first instruction that demarcates a beginning of the code region, and wherein the first instruction is to:
    load the configuration-bit pattern from the internal hardware table using a first operand that points to a data structure;
    store a current value of a retired instruction performance counter to a start count field of the data structure; and
    store a current value of a core cycle performance counter to a start cycle count field of the data structure.

9. A processor comprising:
    a memory to store a set of instructions; and
    a processor core coupled to the memory to execute the set of instructions, wherein the processor core is to:
        identify a code region of the set of instructions that is demarcated for automatic tuning of tunable parameters of the processor, wherein:
            the code region is demarcated by a tune data structure comprising a configuration-bit pattern to enable different combinations of the tunable parameters for system configurations of the processor,
            the tunable parameters are parameters to enable different system configurations of the processor using one or more bits of the configuration-bit pattern; and
            the tunable parameters are stored as configuration-bit patterns in an internal hardware table in microcode, wherein each bit of each of the configuration-bit patterns indicates whether a given tunable parameter is enabled or disabled;
        identify a first instruction that demarcates a beginning of the code region, and wherein the first instruction is to:
            load the configuration-bit pattern from an internal hardware table using a first operand that points to a data structure;
            store a current value of a retired instruction performance counter to a start field of the data structure; and
            store a current value of a core cycle performance counter to a start cycle count field of the data structure
        execute the code region using a first tunable parameter;
        calculate a first metric of the code region that uses the first tunable parameter;
        execute the code region using a second tunable parameter;
        calculate a second metric of the code region that uses the second tunable parameter;
        select a third tunable parameter for the code region from the first and the second tunable parameters based on the first metric and the second metric; and
        in response to the selection of the third tunable parameter, applying the third tunable parameter to change a system configuration of the processor for subsequent execution of the code region for an application;
        identify a subsequent instruction that demarcates an end of the code region, wherein the subsequent instruction is to:
        compute an instructions-per-cycle (IPC) calculation for the code region demarcated between the first instruction and the subsequent instruction;
        write the IPC calculation to a highest IPC field of the data structure when the IPC calculation is greater than a current value of the highest IPC field; and
        copy the one or more bits of a configuration-bits field to a highest configuration-bit field of the data structure when the IPC calculation is greater than the current value of the highest IPC field.

10. The processor of claim 9, wherein the subsequent instruction is further to:
    determine whether a training phase is done for the configuration-bit patterns stored in the internal hardware table;
    select a next configuration-bit pattern from the internal hardware table when the training phase is not done and writing the next configuration-bit pattern into a configuration-bit field;
    determine whether the IPC calculation is greater than the current value of the highest IPC field by a specified amount when the training phase is done; and
    re-enter the training phase when the IPC calculation is greater than the current value of the highest IPC field by the specified amount.

11. A method comprising:
identifying a code region demarcated for automatic tuning of processor parameters of a processor; wherein:
the code region is demarcated by a tune data structure comprising a configuration-bit pattern to enable different combinations of the processor parameters for system configurations of the processor, and
the processor parameters are parameters to enable different system configurations of the processor for different applications using one or more bits of the configuration-bit pattern; and
automatically tuning the processor parameters for the code region, wherein the automatically tuning comprises:
executing the code region using different combinations of the processor parameters;
calculating a metric of the execution of the code region for each of the different combinations of the processor parameters; and
executing the code region using a set of processor parameters, wherein execution of the code region using the set of processor parameters increases a performance of the processor, decreases power consumption of the processor, or both.

12. The method of claim 11, further comprising:
during a training phase,
identifying a first instruction that demarcates a beginning of the code region,
tracking counter values for cycle count and instruction count while the code region is executed,
identifying a subsequent instruction that demarcates an end of the code region, and
in response to the identifying the subsequent instruction,
calculating a performance metric from the counter values for the metric,
determining if the performance metric exceeds a highest performance metric for the set of processor parameters, and
assigning the performance metric as the highest performance metric when the performance metric exceeds the highest performance metric.

13. The method of claim 12, wherein the calculating the performance metric comprises calculating an instructions-per-cycle (IPC).

14. The method of claim 13, wherein the calculating the IPC comprises:
calculating a number of instructions for the executed code region;
calculating a number of cycles for the executed code region; and
dividing the number of instructions by the number of cycles.

15. The method of claim 12, further comprising:
after the training phase,
determining whether the performance metric is greater than a current value of the highest performance metric by a specified amount, and
re-entering the training phase when the performance metric is greater than a current value of the highest performance metric by the specified amount.

16. The method of claim 11, further comprising:
during a training phase,
identifying a first instruction that demarcates a beginning of the code region,
identifying a subsequent instruction demarcates an end of the code region, and
in response to the identifying the subsequent instruction,
calculating a power-consumption metric for the metric of the code region being executed,
determining if the power-consumption metric exceeds a lowest power-consumption metric, and
assigning the power-consumption metric as the lowest power-consumption metric when the power-consumption metric exceeds the lowest power-consumption metric.

17. The method of claim 11, wherein the processor parameters are stored as configuration-bit patterns in an internal hardware table in microcode, wherein each bit of the configuration-bit pattern indicates whether a given processor parameter is enabled or disabled, and wherein the method further comprises:
loading a configuration-bit pattern from the internal hardware table using a first operand that points to a data structure;
storing a current value of a retired instruction performance counter to a start count field of the data structure; and
storing a current value of a core cycle performance counter to a start cycle count field of the data structure.

18. The method of claim 17, further comprising:
identifying a subsequent instruction that demarcates an end of the code region;
computing an instructions-per-cycle (IPC) calculation for the code region demarcated between a first instruction and the subsequent instruction;
writing the IPC calculation to a highest IPC field of the data structure when the IPC calculation is greater than a current value of the highest IPC field; and
copying the bits of a configuration-bit field to a highest configuration-bit field of the data structure when the IPC calculation is greater than the current value of the highest IPC.

19. The method of claim 18, further comprising:
determining whether a training phase is done for the configuration-bit patterns stored in the internal hardware table;
selecting a next configuration-bit pattern from the internal hardware table when the training phase is not done and writing the next configuration-bit pattern into the configuration-bit field;
determining whether the IPC calculation is greater than the current value of the highest IPC field by a specified amount when the training phase is done; and
re-entering the training phase when the IPC calculation is greater than the current value of the highest IPC field by the specified amount.

20. A non-transitory machine-readable storage medium including instructions that, when accessed by a processor, cause the processor to perform operations comprising:
identifying a code region demarcated for automatic tuning of processor parameters of the processor; and
during a training phase,
identifying a first instruction that demarcates a beginning of the code region,
tracking counter values for cycle count and instruction count while the code region is executed,
identifying a subsequent instruction that demarcates an end of the code region, and
in response to the identifying the subsequent instruction,
calculating a performance metric from the counter values, determining whether the performance metric exceeds a highest performance metric for a set of processor parameters, and assigning the performance metric as the highest performance metric when the performance metric exceeds the highest performance metric after the training phase, determining whether the performance metric is greater than a current value of the highest performance metric by a specified amount, and re-entering the training phase when the performance metric is greater than a current value of the highest performance metric by the specified amount automatically tuning the code region, wherein the automatically tuning comprises:

executing the code region using different sets of the processor parameters;

calculating a metric of the code region for each of the different sets of the processor parameters; and executing the code region using a set of processor parameters, wherein execution of the code region using the set of processor parameters increases a performance of the processor, decreases power consumption of the processor, or both.

21. The non-transitory machine-readable storage medium of claim 20, wherein the calculating the performance metric comprises calculating an instructions-per-cycle (IPC).

22. The non-transitory machine-readable storage medium of claim 20, wherein the operations further comprise:

during a training phase, identifying the first instruction that demarcates the beginning of the code region; and identifying the subsequent instruction that demarcates the end of the code region; and in response to the identifying the subsequent instruction, calculating a power-consumption metric for the metric of the code region being executed;

determining if the power-consumption metric exceeds a lowest power-consumption metric for the set of processor parameters; and assigning the power-consumption metric as the lowest power-consumption metric when the power-consumption metric exceeds the lowest power-consumption metric.

* * * * *